United States Patent
Nakanishi

(10) Patent No.: US 11,269,546 B2
(45) Date of Patent: Mar. 8, 2022

(54) MEMORY CONTROLLER, MEMORY SYSTEM, INFORMATION PROCESSING SYSTEM, AND MEMORY CONTROL METHOD

(71) Applicant: SONY SEMICONDUCTOR SOLUTIONS CORPORATION, Kanagawa (JP)

(72) Inventor: Kenichi Nakanishi, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 123 days.

(21) Appl. No.: 16/629,615

(22) PCT Filed: Apr. 3, 2018

(86) PCT No.: PCT/JP2018/014241
§ 371 (c)(1),
(2) Date: Jan. 9, 2020

(87) PCT Pub. No.: WO2019/017017
PCT Pub. Date: Jan. 24, 2019

(65) Prior Publication Data
US 2021/0081136 A1    Mar. 18, 2021

(30) Foreign Application Priority Data
Jul. 18, 2017   (JP) .............................. JP2017-138782

(51) Int. Cl.
*G06F 3/00* (2006.01)
*G06F 3/06* (2006.01)
*G06F 12/02* (2006.01)

(52) U.S. Cl.
CPC .......... *G06F 3/0655* (2013.01); *G06F 3/0604* (2013.01); *G06F 3/0653* (2013.01);
(Continued)

(58) Field of Classification Search
None
See application file for complete search history.

(56) References Cited

U.S. PATENT DOCUMENTS

| | | |
|---|---|---|
| 2009/0248962 A1 | 10/2009 | Kim et al. |
| 2016/0011782 A1 | 1/2016 | Kurotsuchi et al. |
| 2016/0139826 A1 | 5/2016 | Fontana et al. |

FOREIGN PATENT DOCUMENTS

| | | |
|---|---|---|
| CN | 107003810 A | 8/2017 |
| JP | 2012-247848 A | 12/2012 |

(Continued)

OTHER PUBLICATIONS

International Search Report and Written Opinion of PCT Application No. PCT/JP2018/014241, dated May 15, 2018, 11 pages of ISRWO.

*Primary Examiner* — Midys Rojas
(74) *Attorney, Agent, or Firm* — Chip Law Group

(57) ABSTRACT

Efficient wear leveling processing is performed in a memory in which the number of times of writing may vary for each of pages that are access units. An address conversion unit performs address conversion between a logical address of a host command and a physical address of the memory for each of management units, the management units each including a plurality of access units of the memory. A write amount measurement unit measures a write amount for each of the access units in each of the management units. The averaging processing unit selects a target management unit from the management units on the basis of the write amount measured by the write amount measurement unit and changes physical address allocation in the address conversion of the target management unit. Then, the averaging processing unit performs processing of averaging write amounts of the access units in the target management unit.

13 Claims, 25 Drawing Sheets

(52) U.S. Cl.
CPC ............ *G06F 3/0679* (2013.01); *G06F 12/02* (2013.01); *G06F 2212/72* (2013.01)

(56) References Cited

FOREIGN PATENT DOCUMENTS

| | | |
|---|---|---|
| JP | 2013-137861 A | 7/2013 |
| KR | 10-2009-0105143 A | 10/2009 |
| KR | 10-2017-0084194 A | 7/2017 |
| WO | 2010/038736 A1 | 4/2010 |
| WO | 2014/132346 A1 | 9/2014 |
| WO | 2016/077091 A1 | 5/2016 |

FIG. 5

| PHYSICAL SECTION #0 | WRITE AMOUNT INFORMATION #0 | | PHYSICAL PAGE #0 | PAGE WRITE AMOUNT #0 |
|---|---|---|---|---|
| PHYSICAL SECTION #1 | WRITE AMOUNT INFORMATION #1 | | PHYSICAL PAGE #1 | PAGE WRITE AMOUNT #1 |
| ⋮ | ⋮ | | PHYSICAL PAGE #7 | PAGE WRITE AMOUNT #7 |
| PHYSICAL SECTION #32767 | WRITE AMOUNT INFORMATION #32767 | | | SECTION TOTAL WRITE AMOUNT |

*FIG. 6*

| PHYSICAL SECTION #0 | TOTAL WRITE AMOUNT #0 |
|---|---|
| PHYSICAL SECTION #1 | TOTAL WRITE AMOUNT #1 |
| ⋮ | ⋮ |
| PHYSICAL SECTION #32767 | TOTAL WRITE AMOUNT #32767 |

| LOGICAL SECTION #0 | WRITE AMOUNT INFORMATION #0 |
|---|---|
| LOGICAL SECTION #1 | WRITE AMOUNT INFORMATION #1 |
| ⋮ | ⋮ |
| LOGICAL SECTION #29487 | WRITE AMOUNT INFORMATION #29487 |

| LOGICAL PAGE #0 | PAGE WRITE AMOUNT #0 |
|---|---|
| LOGICAL PAGE #1 | PAGE WRITE AMOUNT #1 |
| ⋮ | ⋮ |
| LOGICAL PAGE #7 | PAGE WRITE AMOUNT #7 |

FIG. 12
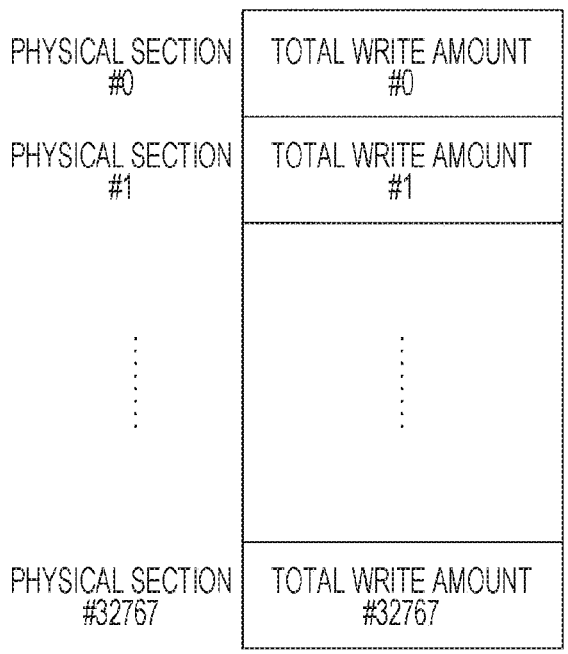
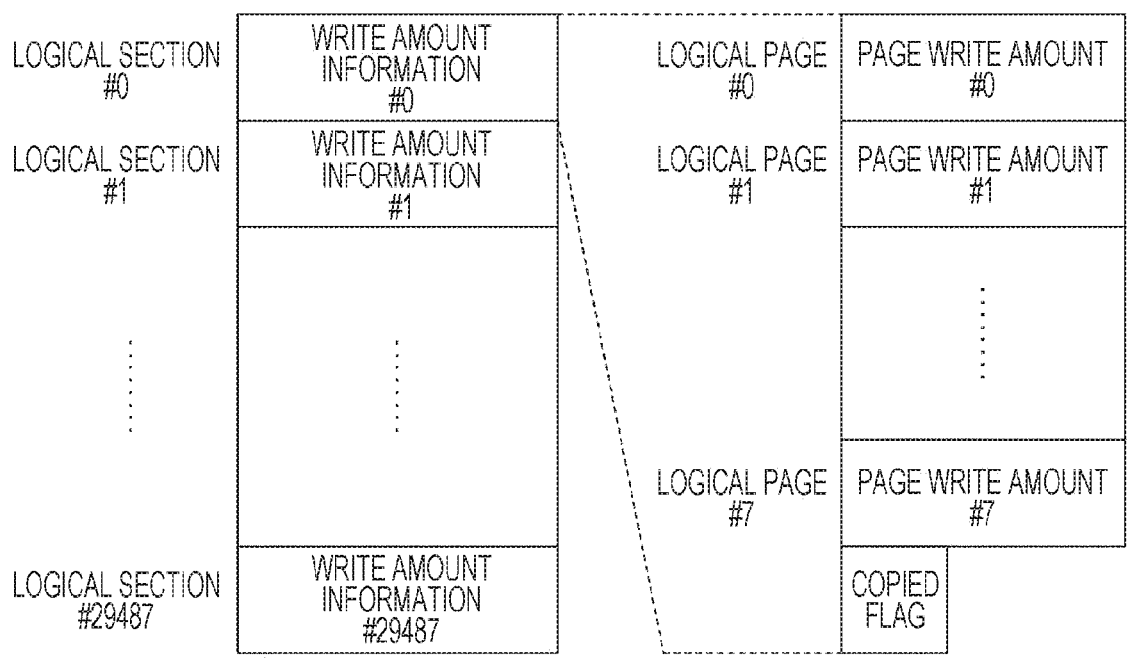

FIG. 24

| | PAGE OFFSET IN PHYSICAL SECTION | | | | | | | |
|---|---|---|---|---|---|---|---|---|
| | 0 | 1 | 2 | 3 | 4 | 5 | 6 | 7 |
| RANDOM NUMBER SEQUENCE #0 | 0 | 1 | 2 | 3 | 4 | 5 | 6 | 7 |
| RANDOM NUMBER SEQUENCE #1 | 1 | 0 | 3 | 2 | 5 | 4 | 7 | 6 |
| RANDOM NUMBER SEQUENCE #2 | 2 | 3 | 0 | 1 | 6 | 7 | 4 | 5 |
| RANDOM NUMBER SEQUENCE #3 | 3 | 2 | 1 | 0 | 7 | 6 | 5 | 4 |
| RANDOM NUMBER SEQUENCE #4 | 4 | 5 | 6 | 7 | 0 | 1 | 2 | 3 |
| RANDOM NUMBER SEQUENCE #5 | 5 | 4 | 7 | 6 | 1 | 0 | 3 | 2 |
| RANDOM NUMBER SEQUENCE #6 | 6 | 7 | 4 | 5 | 2 | 3 | 0 | 1 |
| RANDOM NUMBER SEQUENCE #7 | 7 | 6 | 5 | 4 | 3 | 2 | 1 | 0 |

ADDRESS CONVERSION TABLE 250

| LOGICAL SECTION #0 | PHYSICAL SECTION ADDRESS #0 | RANDOM NUMBER SEQUENCE SELECTION INFORMATION #0 |
|---|---|---|
| LOGICAL SECTION #1 | PHYSICAL SECTION ADDRESS #1 | RANDOM NUMBER SEQUENCE SELECTION INFORMATION #1 |
| ⋮ | ⋮ | ⋮ |
| LOGICAL SECTION #32767 | PHYSICAL SECTION ADDRESS #32767 | RANDOM NUMBER SEQUENCE SELECTION INFORMATION #32767 |

MEMORY CONTROLLER, MEMORY SYSTEM, INFORMATION PROCESSING SYSTEM, AND MEMORY CONTROL METHOD

CROSS REFERENCE TO RELATED APPLICATIONS

This application is a U.S. National Phase of International Patent Application No. PCT/JP2018/014241 filed on Apr. 3, 2018, which claims priority benefit of Japanese Patent Application No. JP 2017-138782 filed in the Japan Patent Office on Jul. 18, 2017. Each of the above-referenced applications is hereby incorporated herein by reference in its entirety.

TECHNICAL FIELD

The present technology relates to a memory controller. Specifically, the present technology relates to: a memory controller that controls writing to a memory; a memory system; an information processing system; a processing method in the memory controller, memory system, and information processing system; and a program that causes a computer to execute the method.

BACKGROUND ART

In a non-volatile storage device on which a non-volatile memory is mounted having an upper limit of the number of times of writing, wear leveling processing is performed for averaging the number of times of writing. In a NAND flash memory that is an example of the non-volatile memory, data cannot be overwritten, a unit of erasing is a block including a plurality of pages that is an access unit for reading and writing, and the wear leveling processing is performed on a block basis. For example, a non-volatile memory has been devised in which the wear leveling processing is performed every time the number of times of erasing of a block having a high writing frequency is a multiple of 100 (see, for example, Patent Document 1).

CITATION LIST

Patent Document

Patent Document 1: Japanese Patent Application Laid-Open No. 2012-247848

SUMMARY OF THE INVENTION

Problems to be Solved by the Invention

In the conventional technology described above, the number of times of erasing of a block is measured, and the wear leveling processing is performed on the basis of the number of times of erasing. In the NAND flash memory on which this conventional technology is premised, since data cannot be overwritten, no variation occurs in the number of times of writing between pages in the block, and an object is to average the number of times of erasing of the block. On the other hand, if a non-volatile memory is assumed in which data can be overwritten, there is a possibility that the number of times of writing varies for each of the pages that is the access unit for reading and writing. However, since the page size is smaller than the block size, there is a problem that if the wear leveling processing is performed by individually handling the number of times of writing of the page, the number of objects becomes enormous and management becomes complicated.

The present technology has been created in view of such a situation, and an object is to perform efficient wear leveling processing in a memory in which the number of times of writing may vary for each of the pages that is the access unit.

Solutions to Problems

The present technology has been made to solve the problems described above, and a first aspect of the present technology is a memory controller, a memory system, an information processing system, and a memory control method therefor, the memory controller including: an address conversion unit that performs address conversion between a logical address and a physical address for each of management units, the management units each including a plurality of access units of a memory; a write amount measurement unit that measures a write amount for each of the access units in each of the management units; and an averaging processing unit that selects a target management unit from the management units on the basis of the measured write amount and changes physical address allocation in the address conversion of the target management unit, to average write amounts of the access units in the target management unit. Therefore, there is an effect of changing the physical address allocation of the target management unit selected on the basis of the write amount, and averaging the write amounts of the access units in the target management unit.

Furthermore, in the first aspect, the averaging processing unit may select one of the management units as the target management unit in a case where deviation occurs in write amounts of the access units in the one of the management units. Therefore, there is an effect of selecting one of the management units as the target management unit in the case where deviation occurs in write amounts of the access units in the one of the management units.

Furthermore, in the first aspect, the averaging processing unit may select one of the management units as the target management unit in a case where a maximum value of write amounts of the access units in the one of the management units is greater than an average value of write amounts of the access units in the one of the management units by a value exceeding a predetermined threshold value. Therefore, there is an effect of selecting one of the management units as the target management unit in a case where a maximum value of write amounts of the access units in the one of the management units is greater than an average value of write amounts of the access units in the one of the management units by a value exceeding a predetermined threshold value.

Furthermore, in the first aspect, a logical address space of the memory may be managed by being divided into an in-use area and an unused area, and the averaging processing unit may select a new allocation destination of the target management unit from the unused area on the basis of the measured write amount and secures the new allocation destination as the in-use area. Therefore, there is an effect of facilitating management of the logical address space.

Furthermore, in the first aspect, the averaging processing unit may select, as the new allocation destination of the target management unit, one of the management units in which a total of write amounts of the access units is less than an overall average value by at least a predetermined threshold value in the unused area. Therefore, there is an effect of selecting, as the new allocation destination of the target management unit, the one of the management units in which the total of the write amounts of the access units is less than the overall average value by at least the predetermined threshold value in the unused area.

Furthermore, in the first aspect, when the physical address allocation of the target management unit is changed, the averaging processing unit may select, as a second target management unit, one of the management units in which a total of write amounts of the access units is less than an overall average value by at least a predetermined threshold value in the in-use area other than the new allocation destination, and select, as a new allocation destination of the second target management unit, one of the management units in which a total of write amounts of the access units is maximized in the unused area, to change physical address allocation in the address conversion of the second target management unit. Therefore, there is an effect of neutralizing an increase in the write amount in the unused area due to the physical address allocation change of the target management unit.

Furthermore, in the first aspect, a flag may be further included that holds, for each of the management targets, that each of the management targets has become a physical address allocation change target, in which the averaging processing unit sets the flag corresponding to the new allocation destination to indicate that the management target has become a physical address allocation change target, and excludes one of the management units in which the flag is set from a selection target when selecting the second target management unit in the in-use area. Therefore, there is an effect of avoiding that a management target having become the new allocation destination is immediately selected as the second target management unit.

Furthermore, in the first aspect, the averaging processing unit may allocate a physical address before allocation change of the target management unit to the unused area, and may allocate the physical address before allocation change of the target management unit to the in-use area for use for other management targets.

Furthermore, in the first aspect, the averaging processing unit, in a case where a total of write amounts of the access units of the target management unit is greater than an overall average value of the management targets by at least a predetermined threshold value, may allocate a physical address before allocation change of the target management unit to the in-use area for use for other management targets, and otherwise, may allocate the physical address before allocation change of the target management unit to the unused area. Therefore, there is an effect of performing allocation to the in-use area or the unused area depending on the total write amount of the target management unit.

Furthermore, in the first aspect, a selection unit may be further included that holds information defining an arrangement order of the access units in the management units for each of the management units, and selects different orders as arrangement orders of the access units in the target management unit before and after physical address allocation change of the target management unit. Therefore, there is an effect of making the arrangement orders of the access units different from each other before and after the physical address allocation change of the target management unit.

Furthermore, in the first aspect, the information defining the arrangement order of the access units may be a plurality of random number sequences different from each other. Therefore, there is an effect of defining the arrangement order of the access units by using the random number sequences.

Effects of the Invention

According to the present technology, it is possible to achieve an excellent effect that efficient wear leveling processing can be performed in the memory in which the number of times of writing may vary for each of the pages that is the access unit. Note that, the effect described here is not necessarily limited, and can be any effect described in the present disclosure.

BRIEF DESCRIPTION OF DRAWINGS

FIG. 5 is a diagram illustrating a first example of a write amount information table 220 in the first embodiment of the present technology.

FIG. 6 is a diagram illustrating a second example of the write amount information table 220 in the first embodiment of the present technology.

FIG. 12 is a diagram illustrating a second example of the write amount information table 220 in the second embodiment of the present technology.

FIG. 24 is a diagram illustrating an example of random number sequences in the fifth embodiment of the present technology.

MODE FOR CARRYING OUT THE INVENTION

The following is a description of a mode for carrying out the present technology (the mode will be hereinafter referred to as the embodiment). The description will be made in the following order.

1. First embodiment (example of averaging write amounts between pages in section)
2. Second embodiment (example of adding processing of reducing write amount in free area)
3. Third embodiment (example of reusing target section of averaging processing)
4. Fourth embodiment (example of performing reuse in a case where write amount is large in target section of averaging processing)
5. Fifth embodiment (example of changing page order in section by changing random number sequence)

1. First Embodiment

[Configuration of Information Processing System]

Figure 1:
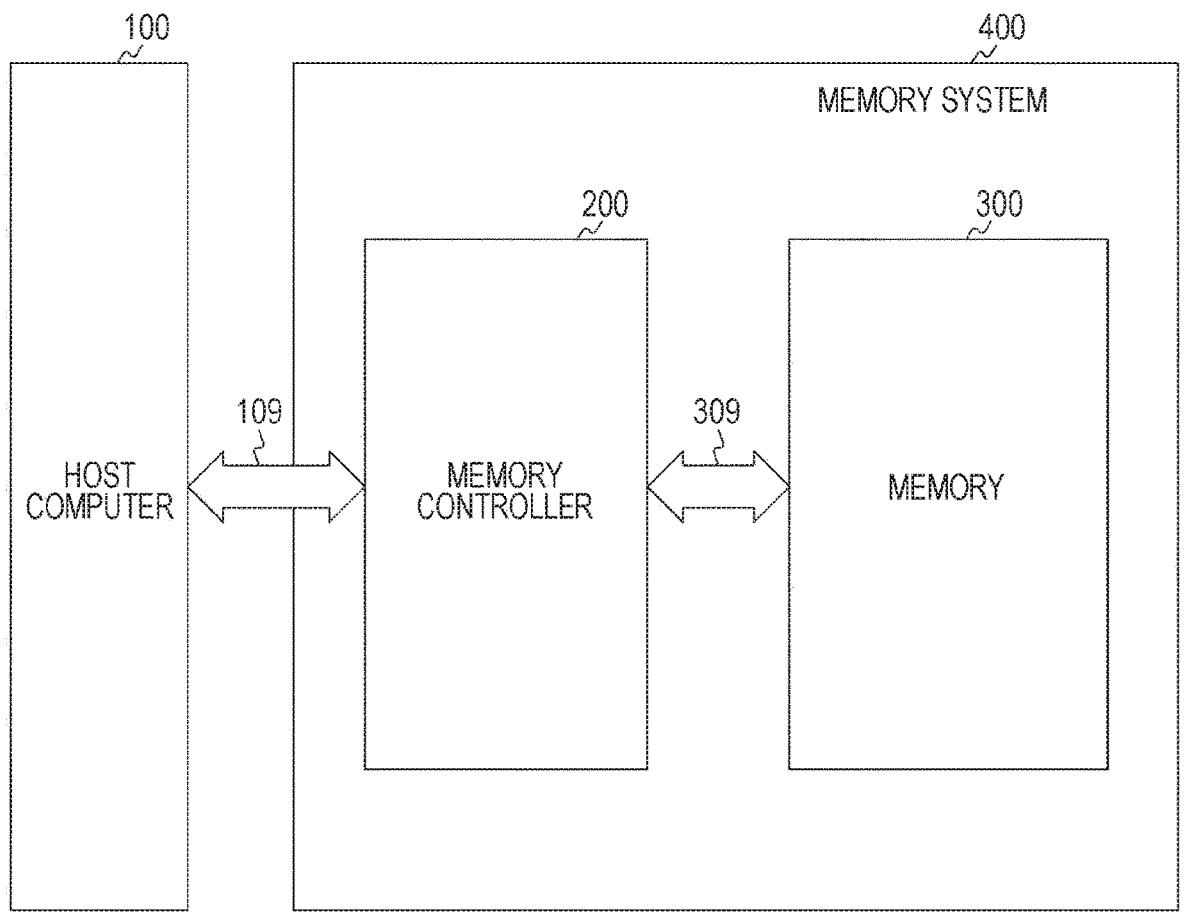
FIG. 1 is a diagram illustrating a configuration example of an information processing system in an embodiment of the present technology.

FIG. 1 is a diagram illustrating a configuration example of an information processing system in an embodiment of the present technology. The information processing system includes a host computer 100, a memory controller 200, and a memory 300. The memory controller 200 and the memory 300 constitute a memory system 400.

The host computer 100 issues commands for instructing the memory 300 to perform data read processing and write processing, and the like. The host computer 100 includes a processor that executes processing as the host computer 100, and a controller interface to communicate with the memory controller 200. The host computer 100 and the memory controller 200 are connected to each other by a signal line 109.

The memory controller 200 performs request control for the memory 300 in accordance with a command from the host computer 100. The memory controller 200 and the memory 300 are connected to each other by a signal line 309.

The memory 300 includes a control unit and a memory cell array. The control unit of the memory 300 accesses a memory cell in accordance with a request from the memory controller 200. The memory cell array of the memory 300 is a memory cell array including a plurality of memory cells, and a large number of memory cells are arrayed two-dimensionally (in a matrix), the memory cells each storing one of two values for each bit or storing one of multiple values for each of multiple bits. The memory cell array is assumed to be a non-volatile memory (NVM) in which data can be overwritten without erasing, with a page having a multiple-byte size as an access unit for reading or writing.

[Configuration of Memory Controller]

Figure 2:
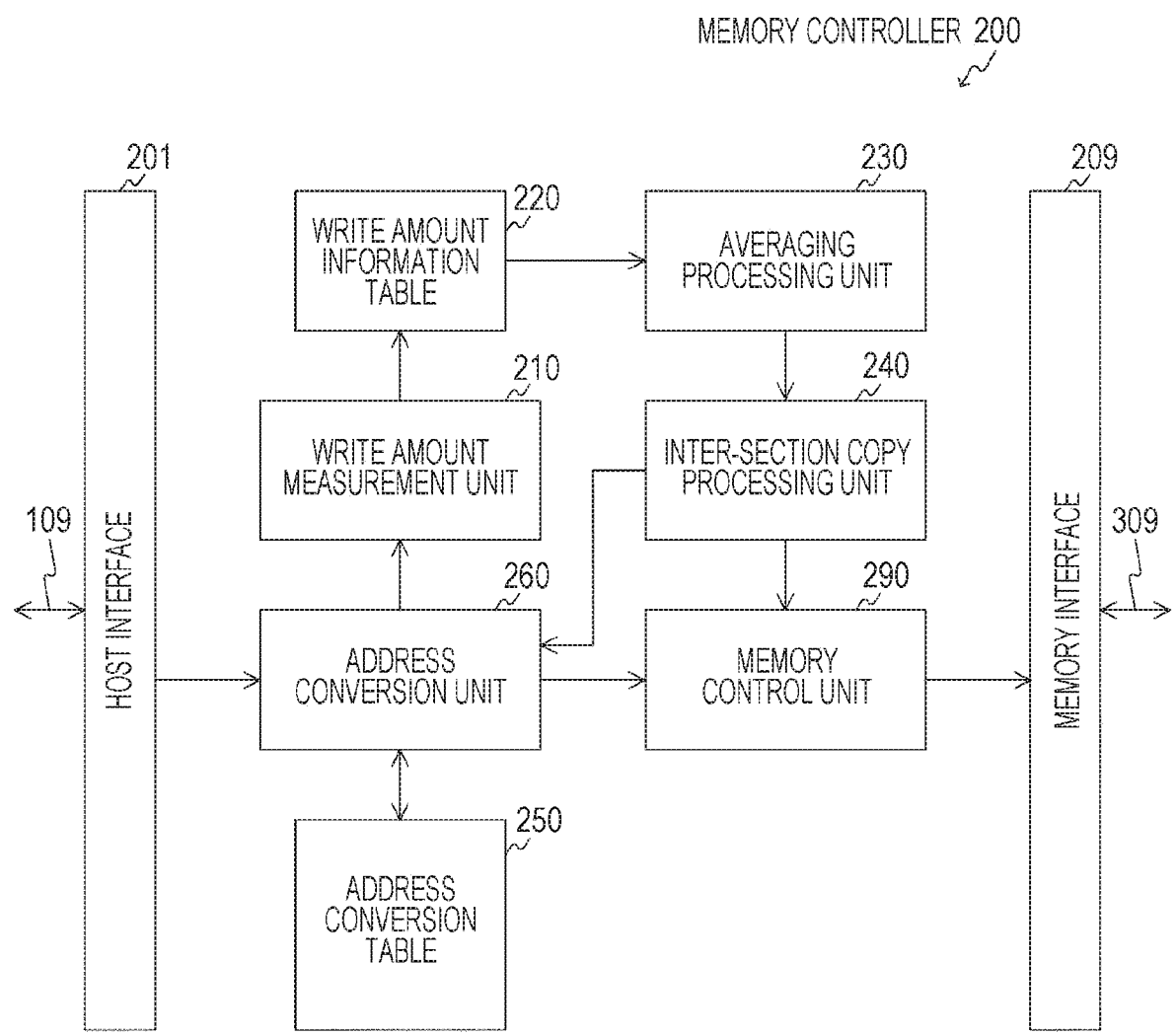
FIG. 2 is a diagram illustrating a configuration example of a memory controller 200 in a first embodiment of the present technology.

FIG. 2 is a diagram illustrating a configuration example of the memory controller 200 in a first embodiment of the present technology. The memory controller 200 includes a write amount measurement unit 210, a write amount information table 220, an averaging processing unit 230, an inter-section copy processing unit 240, an address conversion table 250, an address conversion unit 260, and a memory control unit 290. Furthermore, the memory controller 200 includes a host interface 201 to communicate with the host computer 100, and a memory interface 209 to communicate with the memory 300.

The write amount measurement unit 210 measures a write amount of each page of the memory 300. As described above, the access unit for reading or writing in the memory cell array of the memory 300 is the page. Thus, the write amount and the number of times of writing regarding the page are in a proportional relationship, and are treated as synonymous below. On the other hand, since comparison targets become enormous and management becomes complicated in a case where write amounts on a page basis are compared with each other as they are, a management unit called a section is newly introduced as a unit including a plurality of pages.

The write amount information table 220 is a table holding write amount information that is information regarding the write amount measured by the write amount measurement unit 210. Contents of the write amount information held in the write amount information table 220 will be described later.

The averaging processing unit 230 selects a target section on the basis of the write amount information held in the write amount information table 220, and performs wear leveling processing that averages the write amounts of the pages included in the target section. For that purpose, the averaging processing unit 230 changes physical address allocation in address conversion of the target section, to change the physical address of the memory 300 to be written thereafter to a different one.

The inter-section copy processing unit 240 performs processing of copying data written in the target section to an allocation change destination section to implement averaging processing by the averaging processing unit 230.

The address conversion table 250 is a table storing a correspondence relationship between a logical address included in a command from the host computer 100 and a physical address of the memory 300. The address conversion unit 260 refers to the address conversion table 250 and converts the logical address included in the command from the host computer 100 into the physical address of the memory 300.

The memory control unit 290 controls access to the memory 300. The memory control unit 290 accesses the memory 300 in accordance with the physical address converted by the address conversion unit 260. Furthermore, the memory control unit 290 accesses the memory 300 to copy the data written in the target section of the averaging processing to the allocation change destination section in accordance with an instruction from the inter-section copy processing unit 240.

[Section]

Figure 3:
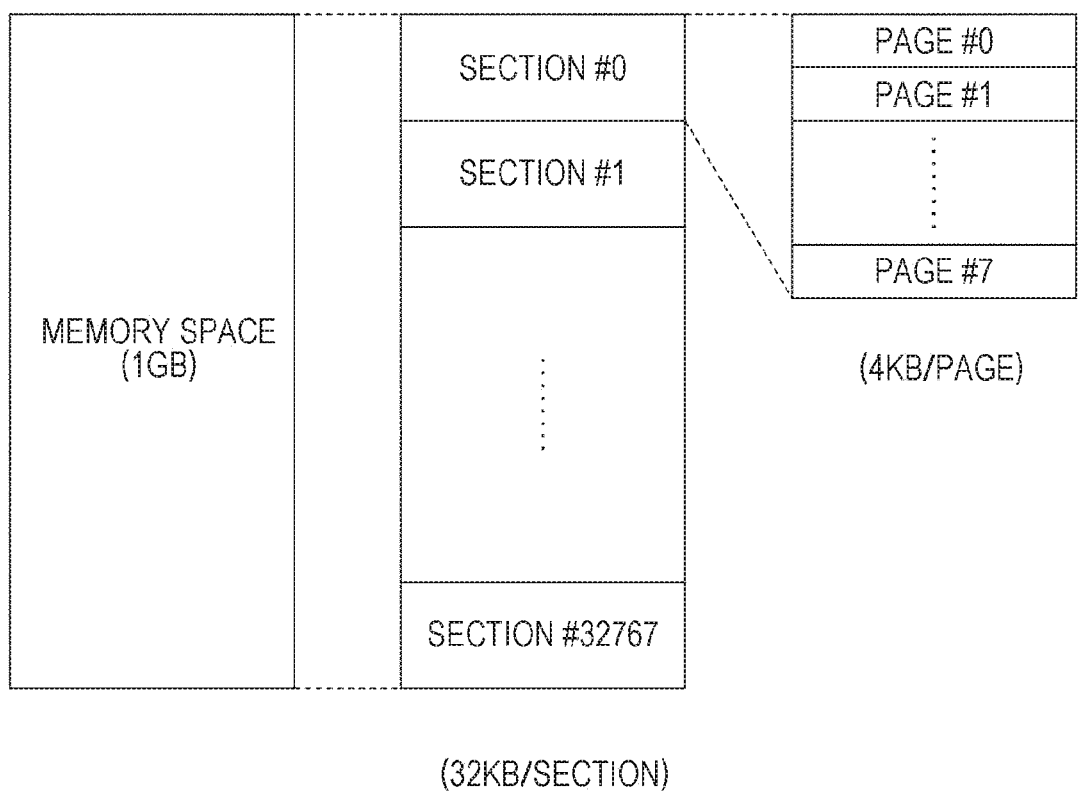
FIG. 3 is a diagram illustrating an example of a relationship between a section and a page in the embodiment of the present technology.

FIG. 3 is a diagram illustrating an example of a relationship between a section and a page in the embodiment of the present technology. Here, a 1 GB (gigabyte) memory space is assumed. Then, in the memory space, the size of the page that is the access unit for reading or writing is 4 KB (kilobytes). In this case, the total number of pages in the memory space is 256 K pages. To detect deviation in the write amount between pages in the memory 300, it can be considered to compare the write amounts of these 256 K pages with each other and average them, but in that case, the comparison amount becomes enormous and the management becomes complicated.

Thus, in this embodiment, averaging of the write amounts of the pages are performed with the section including the plurality of pages as the management unit. In this example, eight pages are included in one section. That is, the amount of data corresponding to one section is 32 KB. Furthermore, the 1 GB memory space is managed by being divided into 32 K (=32768) sections from section #0 to #32767.

Figure 4:
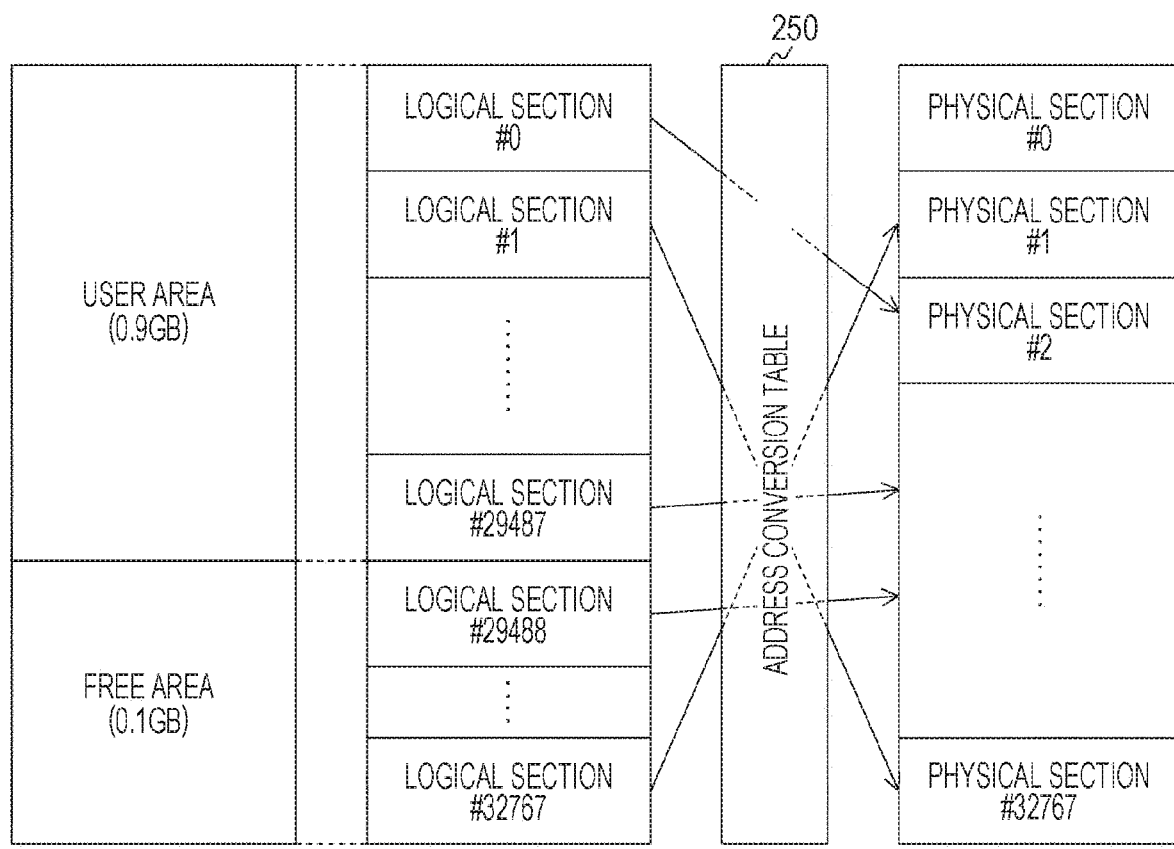
FIG. 4 is a diagram illustrating an example of a relationships between a logical section and a physical section in the embodiment of the present technology.

FIG. 4 is a diagram illustrating an example of a relationship between a logical section and a physical section in the embodiment of the present technology. A logical address space is managed by being divided into a user area and a free area. The user area is an in-use area allocated as a use area for a user. On the other hand, the free area is an unused area that is not allocated as the use area for the user. Note that, the user area is an example of the in-use area described in the claims. Furthermore, the free area is an example of the unused area described in the claims.

In this example, the user area is a user area of 0.9 GB (921.5 MB), and the free area is an area of 0.1 GB (102.5 MB). At this time, the user area has 29488 sections of logical sections #0 to #29487, and the free area has 3280 sections of logical sections #29488 to #32767.

These logical sections are allocated to physical sections of the memory 300. Correspondence relationships between the logical sections and the physical sections are stored in the address conversion table 250. In accordance with the address conversion table 250, the address conversion unit 260 performs conversion from the logical sections to the physical sections.

[Write Amount Information]

FIG. 5 is a diagram illustrating a first example of the write amount information table 220 in the first embodiment of the present technology. The write amount information according to the first example is an example in a case where the write amount information is held for every physical section. In the first example, corresponding to each physical section, the page write amount of each of the eight physical pages included in the physical section and the total write amount of the physical section are stored.

The page write amount is the write amount for each page, and is initialized to zero each time the averaging processing is performed. The page write amount is used to detect deviation between pages of the write amount in the physical section.

A section total write amount is a value obtained by adding all the write amounts having occurred in the physical section, and is not assumed to be initialized. The section total write amount is used to select a physical section in the averaging processing.

The deviation in the page write amount is detected, for example, in a case where the write amount is greater than an average value of the page write amounts in a certain section by a value exceeding a predetermined threshold value $\alpha$. That is, in a case where the following expression is satisfied in a section where writing has occurred, the section is selected as the target section of the averaging processing.

$$\text{Maximum page write amount} - \text{Average value of page write amounts} > \alpha$$

In the above expression, the threshold value $\alpha$ is assumed to be about 1024 to 2048, for example, and it is considered that an appropriate effect is obtained in this range. As an example, assuming a case where writing has occurred in a specific page in a section and the number of pages is changed of the page in which the writing has occurred, the number of repetitions of writing until the difference from the average write amount reaches $\alpha=1024$ times (pages) is obtained as follows. However, it is assumed that writing has occurred evenly between the pages in which the writing has occurred.

Number of pages in which writing has occurred=1:1170−146=1024

Number of pages in which writing has occurred=2:1365−341=1024

Number of pages in which writing has occurred=3:1638−614=1024

Number of pages in which writing has occurred=4:2048−1024=1024

Number of pages in which writing has occurred=5:2730−1706=1024

Number of pages in which writing has occurred=6:4096−3072=1024

Number of pages in which writing has occurred=7:8192−7168=1024

Number of generated pages=8:0 (equal to all pages in the section)

According to the above number of pages, for example, in a case where writing is concentrated on one specific page, the deviation in the page write amount is detected when the write amount reaches 1170 times. On the other hand, in a case where writing is concentrated on specific five pages, the deviation in the page write amount is detected when the write amount reaches 2730 times. That is, the smaller the number of specific pages on which writing is concentrated in the section, the greater the change in the difference from the average write amount. Thus, it is understood that, even if the section total write amount is the same, the smaller the number of pages in which writing has occurred concentrated in the section is, the earlier the wear leveling processing needs to be started.

FIG. 6 is a diagram illustrating a second example of the write amount information table 220 in the first embodiment of the present technology. In the second example, similarly to the first example described above, the total write amount of the physical section is stored for every physical section. On the other hand, in the second example, unlike the first example described above, other information is stored for each logical section of the user area. That is, corresponding to each logical section of the user area, the page write amount of each of the eight logical pages included in the logical section is stored.

The total write amount is referred to for both the user area and the free area, but for the other information, since the user area in use is targeted, it is possible to manage only the latter with the logical address.

[Operation]

Figure 7:
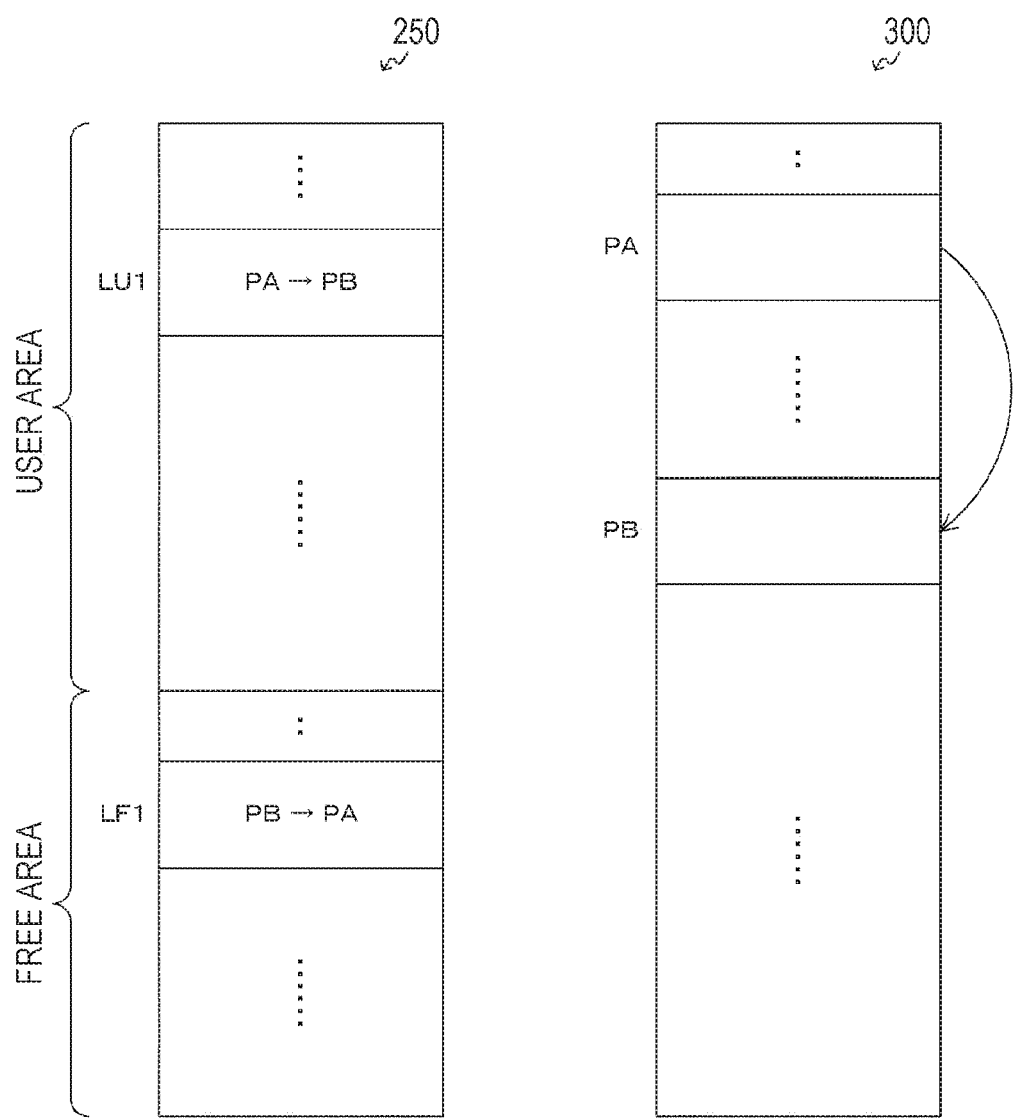
FIG. 7 is a diagram illustrating a schematic example of averaging processing in the first embodiment of the present technology.

FIG. 7 is a diagram illustrating a schematic example of the averaging processing in the first embodiment of the present technology. Here, a case is assumed where a section A is selected as a logical section having deviation in the write amount between pages. At that time, it is assumed that a physical section PA is allocated as the physical address of the section A. That is, it is assumed that the physical section PA has been stored corresponding to a logical section LU1 of the user area, in the address conversion table 250.

Here, when the deviation in the page write amount is detected in the section A, the section A is selected as the target section of the average processing by the averaging processing unit 230. For the averaging processing, as a new allocation destination of the section A, a section is selected having a minimum total write amount in the free area. In this example, it is assumed that a section B of a physical section PB is selected as the new allocation destination. That is, it is assumed that the physical section PB has been stored corresponding to a logical section LF1 of the free area, in the address conversion table 250.

Data of the section A stored in the physical section PA is copied to the physical section PB by the inter-section copy processing unit 240. Therefore, the deviation is corrected in the page write amount of the section A having occurred in the physical section PA. Then, change is performed so that the physical section PB is stored corresponding to the logical section LU1 in the address conversion table 250, and the physical section PA is stored corresponding to the logical section LF1. That is, in this example, the physical section PA is managed as the free area.

Figure 8:
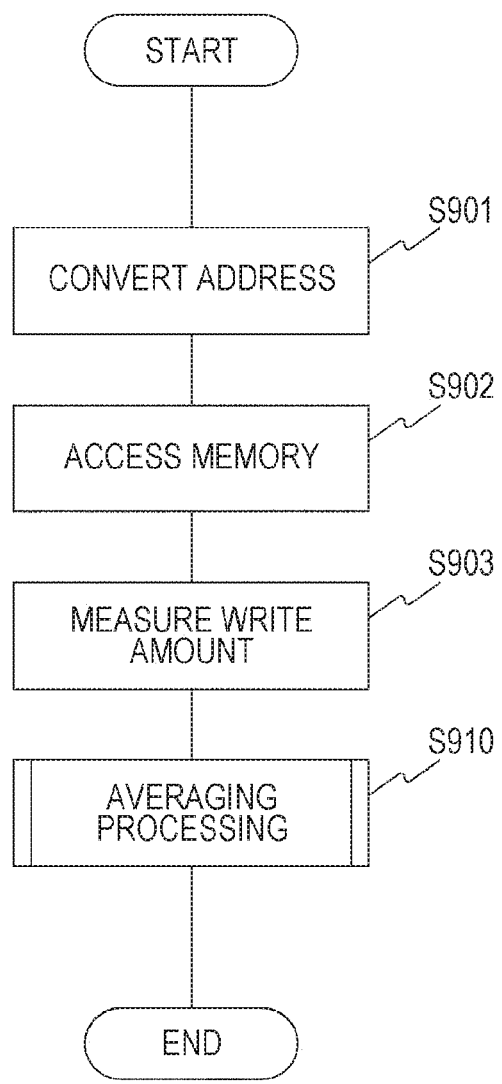
FIG. 8 is a flowchart illustrating an example of a processing procedure of memory access processing in the first embodiment of the present technology.

FIG. 8 is a flowchart illustrating an example of a processing procedure of memory access processing in the first embodiment of the present technology.

When receiving a memory access command from the host computer 100, the address conversion unit 260 converts a logical address included in the command into a physical address (step S901). Then, in accordance with the converted physical address, the memory control unit 290 accesses the memory 300 via the memory interface 209 (step S902).

At that time, in a case where writing to the memory 300 is performed, the write amount measurement unit 210 updates the write amount information table 220 in accordance with the writing address (step S903). Then, the averaging processing unit 230 performs the averaging processing with reference to the write amount information table 220 (step S910).

Figure 9:
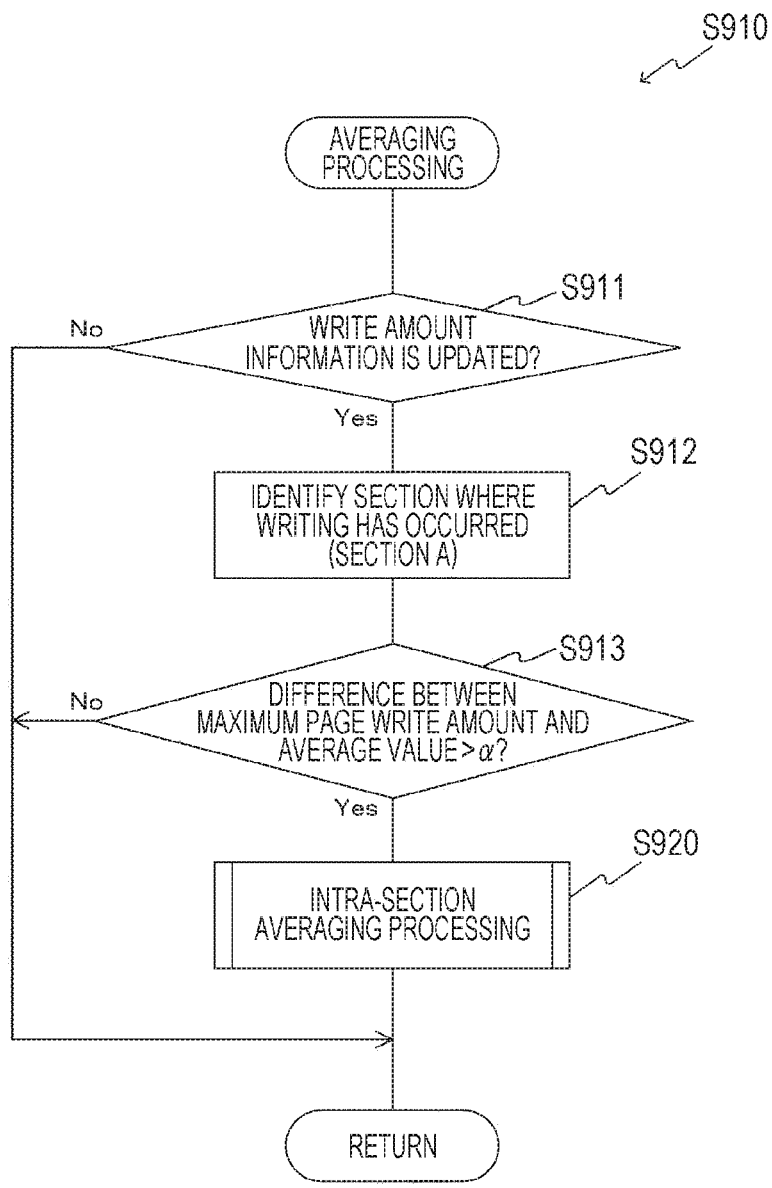
FIG. 9 is a flowchart illustrating an example of a processing procedure of the averaging processing in the first embodiment of the present technology.

FIG. 9 is a flowchart illustrating an example of a processing procedure of the averaging processing in the first embodiment of the present technology.

When the write amount information is updated in the write amount information table 220 (step S911: Yes), the averaging processing unit 230 identifies the section where the writing has occurred (step S912). Hereinafter, the specified logical section is referred to as the section A.

The averaging processing unit 230 determines whether or not the difference between the maximum page write amount and the average value of the page write amount is greater than the threshold value α in the section A where the writing has occurred (step S913). Then, in a case where the difference is greater than the threshold value α (step S913: Yes), the averaging processing unit 230 performs intra-section averaging processing (step S920).

Figure 10:
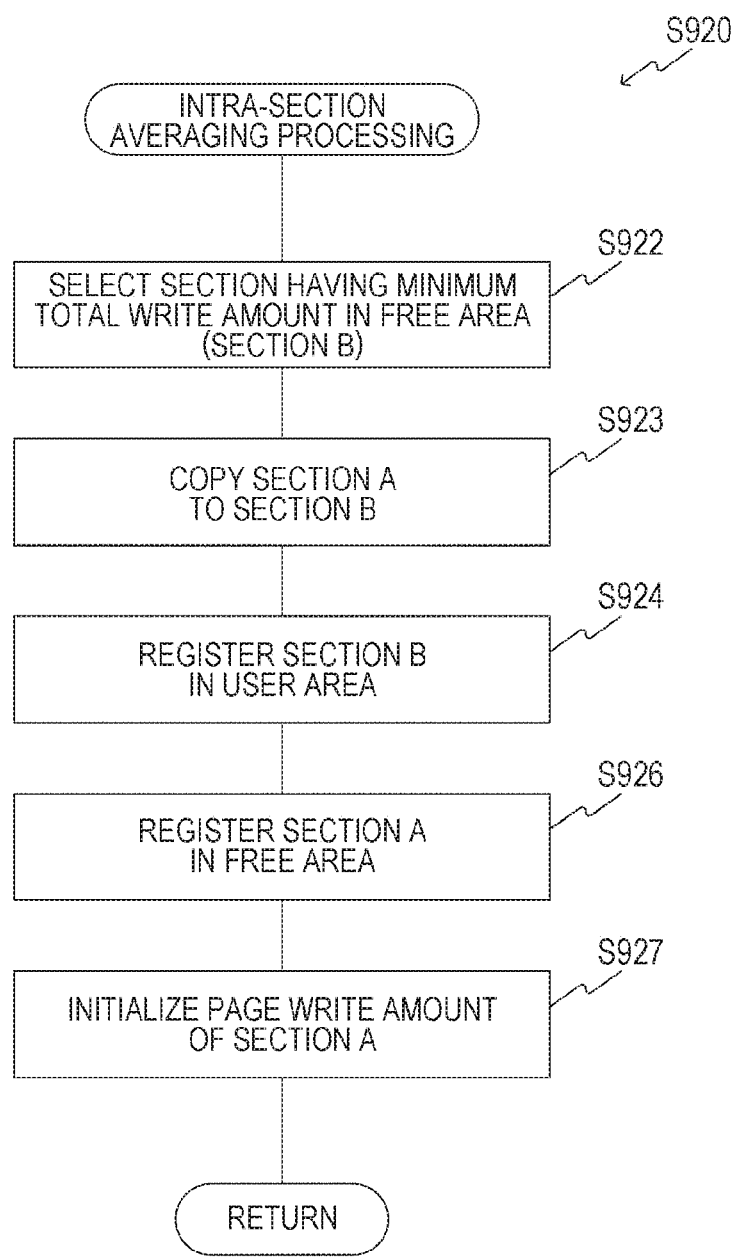
FIG. 10 is a flowchart illustrating an example of a processing procedure of intra-section averaging processing (step S920) in the first embodiment of the present technology.

FIG. 10 is a flowchart illustrating an example of a processing procedure of the intra-section averaging processing (step S920) in the first embodiment of the present technology.

The averaging processing unit 230 refers to the write amount information table 220, and selects the section having the minimum total write amount in the free area (step S922). Hereinafter, the selected logical section is referred to as the section B. Note that, in this example, the section having the minimum total write amount is selected in the free area; however, a section may be selected having a total write amount less than the average value of the total write amount in the whole by at least a predetermined threshold value, in the free area.

Then, the inter-section copy processing unit 240 copies the data stored in the section A to the physical section PB of the section B (step S923).

The address conversion unit 260 registers the physical section PB allocated to the section B in the user area (step S924). That is, in the example described above, the physical section PB is stored corresponding to the logical address LU1 of the user area in the address conversion table 250.

Furthermore, the address conversion unit 260 registers the physical section PA allocated to the section A in the free area (step S926). That is, in the example described above, the physical section PA is stored corresponding to the logical address LF1 of the free area in the address conversion table 250. Furthermore, the write amount measurement unit 210 initializes the page write amount of the section A in the write amount information table 220 to "0" (step S927).

As described above, according to the first embodiment of the present technology, deviation is detected in the write amount between pages in the section where writing has occurred, and the physical address allocation is changed, whereby the averaging processing can be performed of the page write amount in the section.

2. Second Embodiment

In the first embodiment described above, the intra-section averaging processing is performed by changing the physical address allocation of the section in which deviation is detected in the page write amount. In the intra-section averaging processing, the section is selected having the minimum total write amount in the free area, and the physical address is replaced with that of the section where the deviation is detected in the page write amount, whereby the physical address allocation is changed. Therefore, focusing on the free area, the write amount increases.

Thus, in this second embodiment, after the intra-section averaging processing, a section having the minimum total write amount in the user area and a section having the maximum total write amount in the free area are replaced with each other, whereby reduction is achieved of the write amount in the free area. That is, this inter-section averaging processing neutralizes a write amount increase in the free area due to the intra-section averaging processing, and averages the write amount of the entire memory 300.

Note that, since the overall configuration as the information processing system and the block configuration of the memory controller are similar to those of the first embodiment described above, the detailed description thereof is omitted.

[Write Amount Information]

In the inter-section averaging processing, if a section immediately after being allocated by the intra-section averaging processing is selected when the section having the minimum total write amount in the user area is selected, there is a possibility that intended averaging is not performed. Therefore, in the second embodiment, as write information, a copied flag is provided indicating that a section is of immediately after copying having been performed by the intra-section averaging processing, whereby it is avoided that the section is selected in the inter-section averaging processing.

Figure 11:
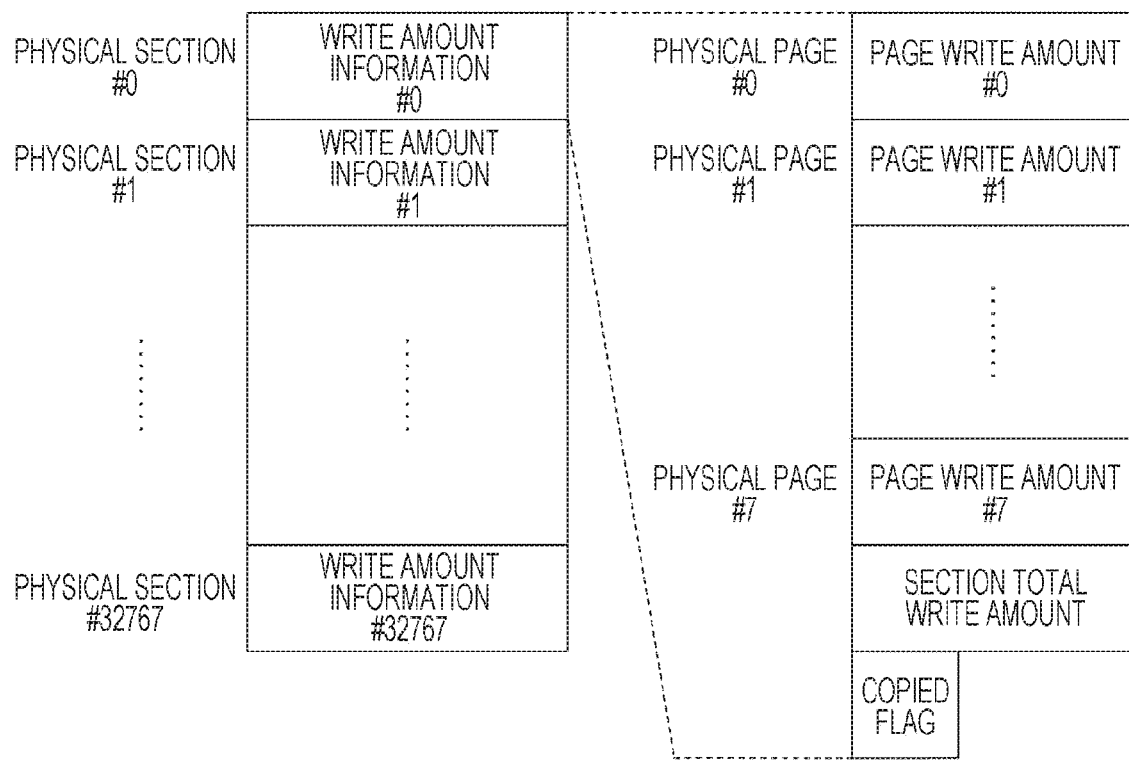
FIG. 11 is a diagram illustrating a first example of the write amount information table 220 in a second embodiment of the present technology.

FIG. 11 is a diagram illustrating a first example of the write amount information table 220 in the second embodiment of the present technology. The write amount information according to the first example is an example in a case where the write amount information is held for every physical section. In the first example, corresponding to each physical section, the copied flag is stored, in addition to the page write amount and section total write amount described in the first embodiment.

The copied flag is a flag set for a section allocated to the user area by the intra-section averaging processing. The section in which the copied flag is set is excluded from the target in the search for the user area in the inter-section averaging processing. Note that, the copied flag is an example of the flag described in the claims.

FIG. 12 is a diagram illustrating a second example of the write amount information table 220 in the second embodiment of the present technology. In the second example, corresponding to each logical section, the copied flag is stored, in addition to the page write amount and section total write amount described in the first embodiment. The role as the copied flag is similar to that in the first example.

[Operation]

Figure 13:
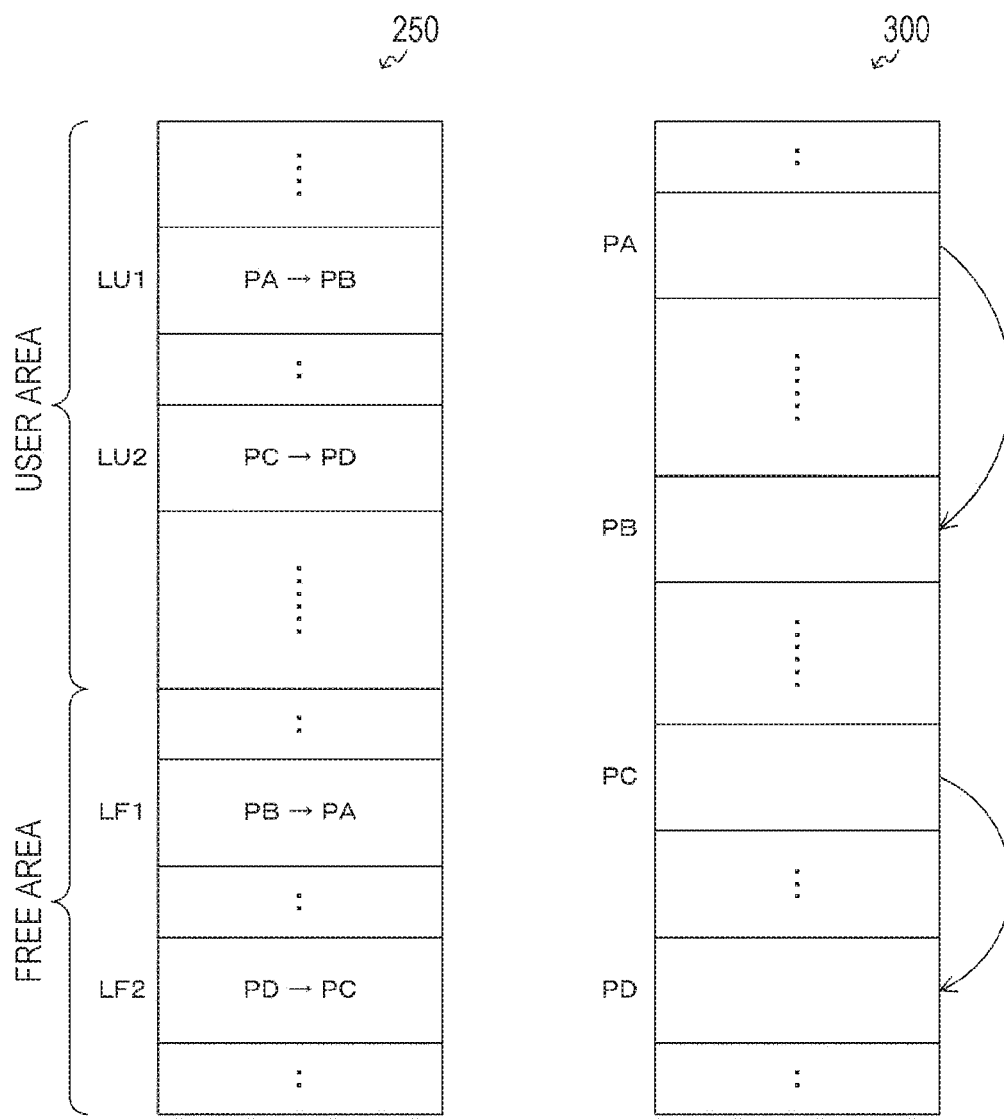
FIG. 13 is a diagram illustrating a schematic example of averaging processing in the second embodiment of the present technology.

FIG. 13 is a diagram illustrating a schematic example of the averaging processing in the second embodiment of the present technology. Here, similarly to the first embodiment described above, as the intra-section averaging processing, the section A having deviation in the write amount between pages is selected as a logical section, and the data in the section A is copied to the physical section PB by the inter-section copy processing unit 240.

Furthermore, in the second embodiment, after the intra-section averaging processing, a logical section having the minimum total write amount and the copied flag being "0" in the user area is selected as a section C. At that time, it is assumed that a physical section PC is allocated as the physical address of the section C. That is, it is assumed that the physical section PC has been stored corresponding to a logical section LU2 of the user area, in the address conversion table 250.

On the other hand, the section having the maximum total write amount in the free area is selected and becomes a new allocation destination. In this example, it is assumed that a section D of a physical section PD is selected as the new allocation destination. That is, it is assumed that the physical section PD has been stored corresponding to a logical section LF2 in the free area, in the address conversion table 250.

Data of the section C stored in the physical section PC is copied to the physical section PD by the inter-section copy processing unit 240. Then, change is performed so that the physical section PD is stored corresponding to the logical section LU2 in the address conversion table 250, and the physical section PC is stored corresponding to the logical section LF2. Therefore, the section having the minimum total write amount in the user area and the section having the maximum total write amount in the free area are replaced with each other, and the write amount in the free area is reduced. That is, the write amount increase in the free area caused by the intra-section averaging processing is neutralized.

Figure 14:
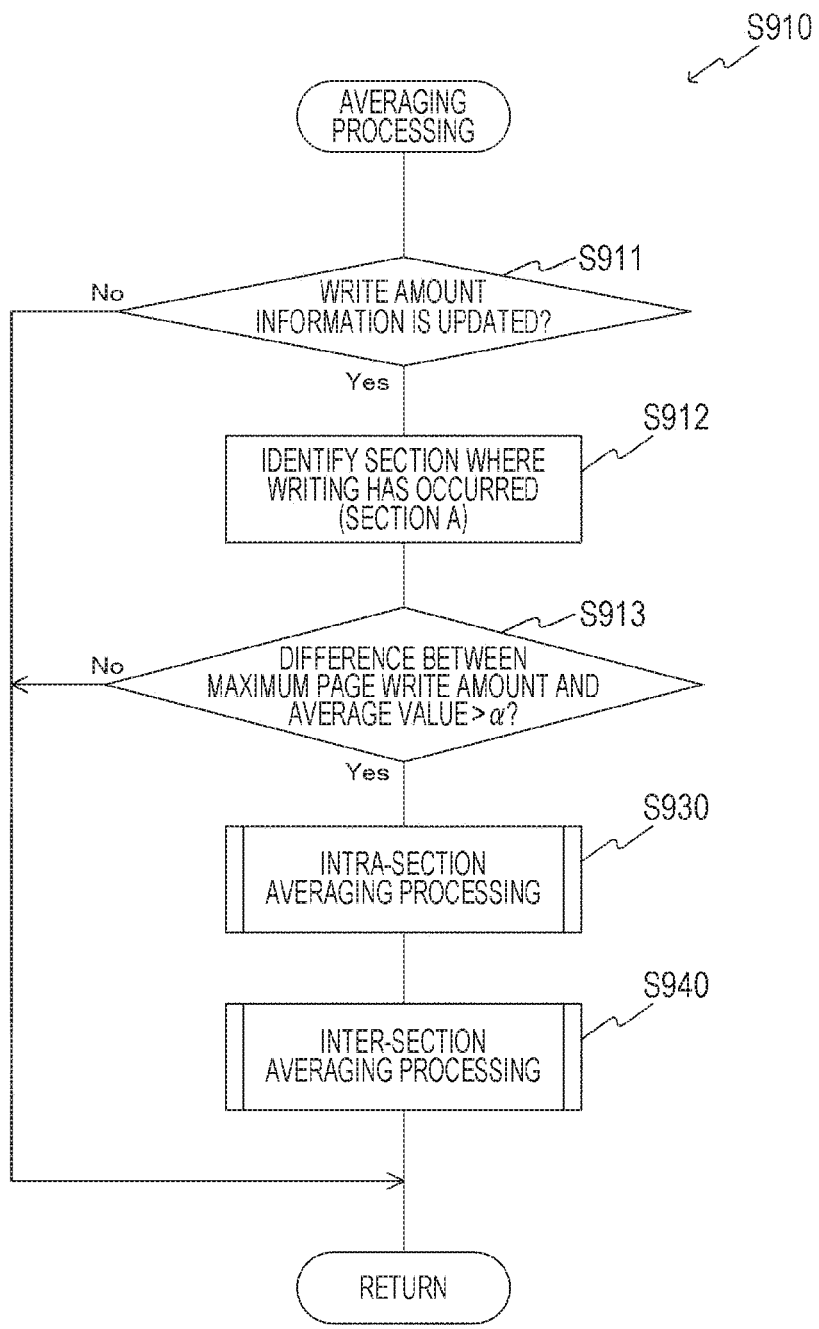
FIG. 14 is a flowchart illustrating an example of a processing procedure of the averaging processing in the second embodiment of the present technology.

FIG. 14 is a flowchart illustrating an example of a processing procedure of the averaging processing in the second embodiment of the present technology. Note that, since the overall processing of the memory access processing is similar to that of the first embodiment described above, the description thereof is omitted.

When the write amount information is updated in the write amount information table 220 (step S911: Yes), the averaging processing unit 230 identifies the section A where the writing has occurred (step S912). This point is similar to that in the first embodiment described above.

The averaging processing unit 230 determines whether or not the difference between the maximum page write amount and the average value of the page write amount is greater than the threshold value α in the section A where the writing has occurred (step S913). Then, in a case where the difference is greater than the threshold value α (step S913: Yes), the averaging processing unit 230 performs the intra-section averaging processing (step S930) and the inter-section averaging processing (step S940).

Figure 15:
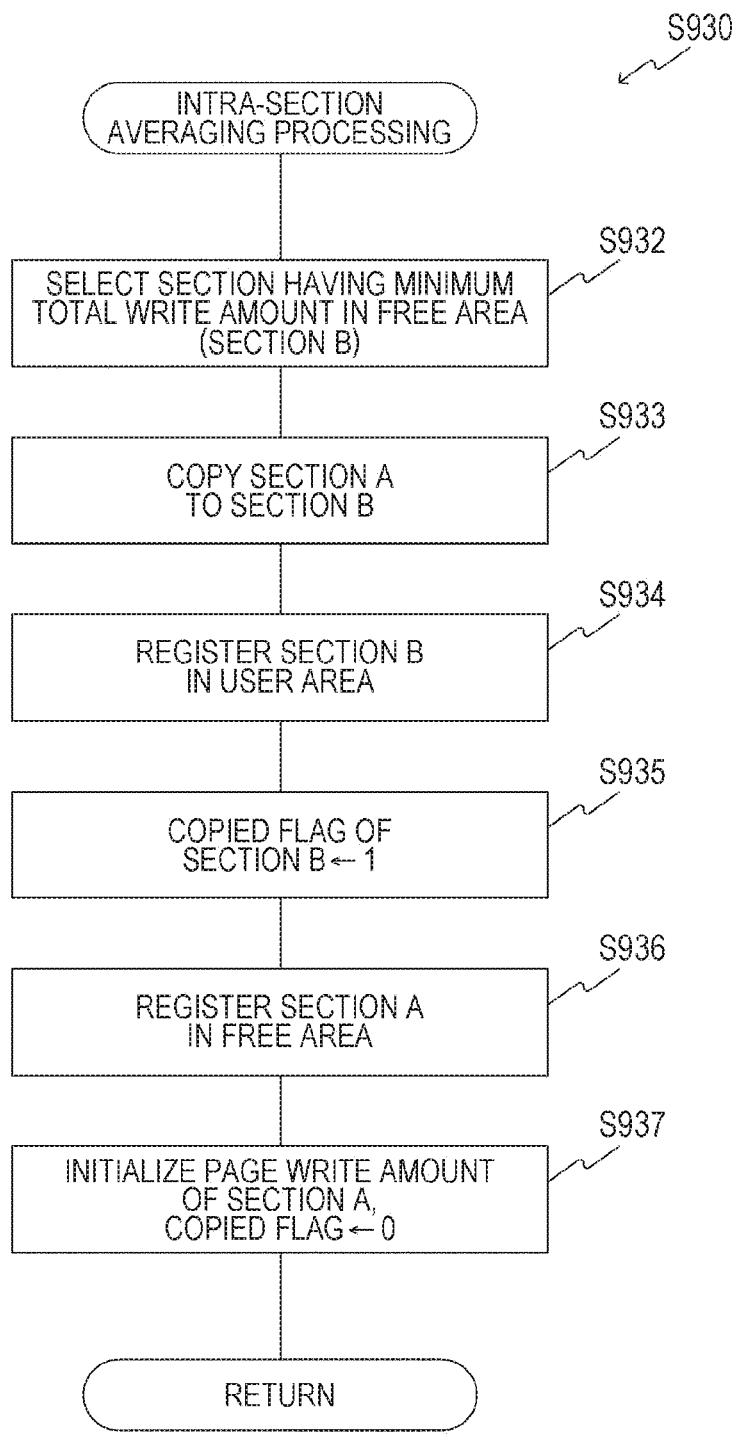
FIG. 15 is a flowchart illustrating an example of a processing procedure of intra-section averaging processing (step S930) in the second embodiment of the present technology.

FIG. 15 is a flowchart illustrating an example of a processing procedure of the intra-section averaging processing (step S930) in the second embodiment of the present technology.

The averaging processing unit 230 refers to the write amount information table 220, and selects the section B having the minimum total write amount in the free area (step S932). Note that, in this example, the section having the minimum total write amount is selected in the free area; however, a section may be selected having a total write amount less than the average value of the total write amount in the whole by at least a predetermined threshold value, in the free area.

Then, the inter-section copy processing unit 240 copies the data stored in the section A to the physical section PB of the section B (step S933).

The address conversion unit 260 registers the physical section PB allocated to the section B in the user area (step S934). That is, in the example described above, the physical section PB is stored corresponding to the logical address LU1 of the user area in the address conversion table 250.

Furthermore, the write amount measurement unit 210 sets the copied flag of the section B in the write amount information table 220 to "1" (step S935).

Furthermore, the address conversion unit 260 registers the physical section PA allocated to the section A in the free area (step S936). That is, in the example described above, the physical section PA is stored corresponding to the logical address LF1 of the free area in the address conversion table 250.

Furthermore, the write amount measurement unit 210 initializes the page write amount of the section A in the write amount information table 220 to "0", and resets the copied flag of the section A to "0" (step S937).

Figure 16:
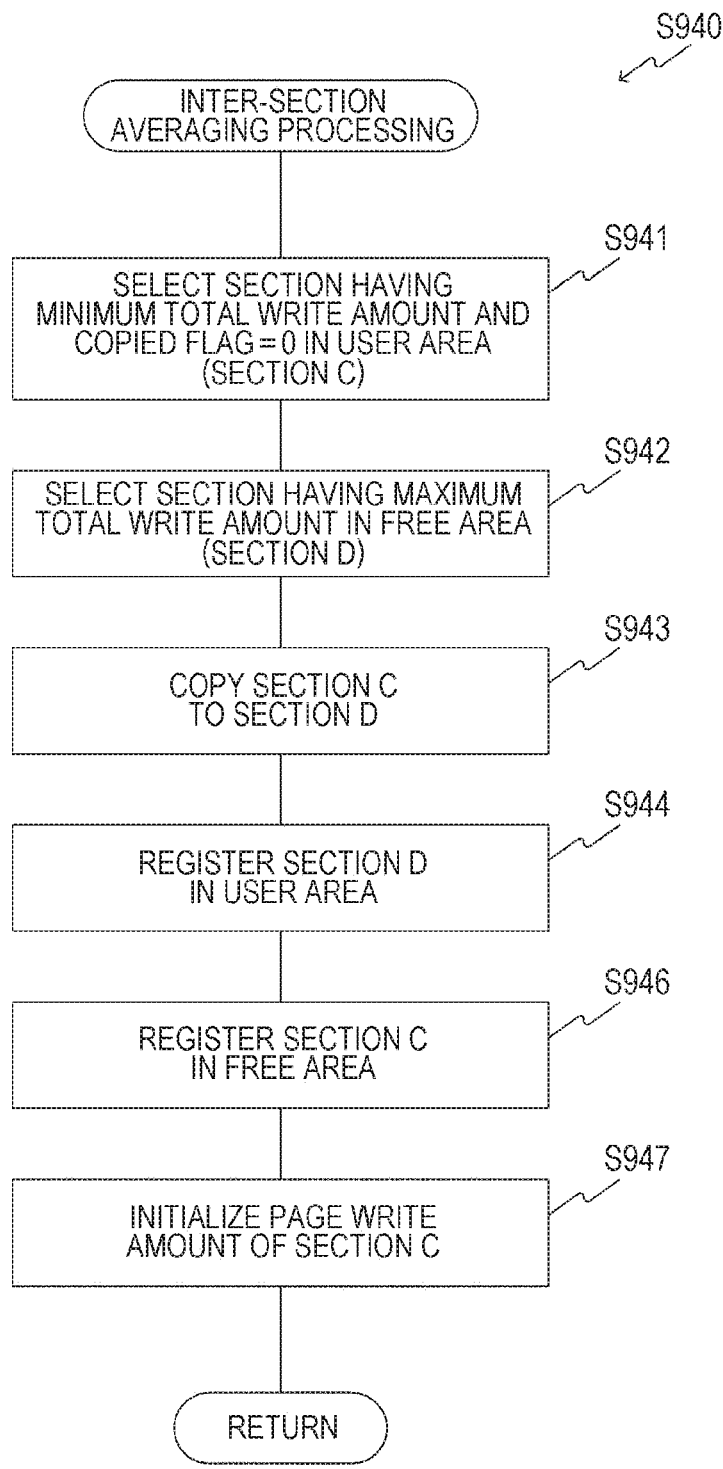
FIG. 16 is a flowchart illustrating an example of a processing procedure of inter-section averaging processing (step S940) in the second embodiment of the present technology.

FIG. 16 is a flowchart illustrating an example of a processing procedure of the inter-section averaging processing (step S940) in the second embodiment of the present technology.

The averaging processing unit 230 refers to the write amount information table 220, and selects a section having the minimum total write amount in the user area and the copied flag being "0" (step S941). Hereinafter, the selected logical section is referred to as the section C. Note that, in this example, the section having the minimum total write amount is selected in the user area; however, a section may be selected having a total write amount less than the average value of the total write amount in the whole by at least a predetermined threshold value, in the user area. In this case, when the section having the total write amount less than the average value by at least the predetermined threshold value is found, the section can be set as a new allocation destination, and the search time can be shortened.

The averaging processing unit 230 refers to the write amount information table 220, and selects the section having the maximum total write amount in the free area (step S942). Hereinafter, the selected logical section is referred to as the section D.

Then, the inter-section copy processing unit 240 copies the data stored in the section C to the physical section PD of the section D (step S943).

The address conversion unit 260 registers the physical section PD allocated to the section D in the user area (step S944). That is, in the example described above, the physical section PD is stored corresponding to the logical address LU2 of the user area in the address conversion table 250.

Furthermore, the address conversion unit 260 registers the physical section PC allocated to the section C in the free area (step S946). That is, in the example described above, the physical section PC is stored corresponding to the logical address LF2 of the free area in the address conversion table 250. Furthermore, the write amount measurement unit 210 initializes the page write amount of the section C in the write amount information table 220 to "0" (step S947).

As described above, in the second embodiment of the present technology, after the intra-section averaging processing, the section having the minimum total write amount in the user area and the section having the maximum total write amount in the free area are replaced with each other. Therefore, the increase can be neutralized in the write amount in the free area due to the intra-section averaging processing.

3. Third Embodiment

In the second embodiment described above, after the intra-section averaging processing, the section having the minimum total write amount in the user area and the section having the maximum total write amount in the free area are replaced with each other, whereby the reduction is achieved of the write amount in the free area. In this case, to neutralize the increase in the write amount in the free area due to the intra-section averaging processing, although a large effect can be obtained, it is necessary to select the section having the maximum total write amount in the free area. On the other hand, depending on the write amount of the physical section PA in which a target section of the intra-section averaging processing has been stored, there may be a case where the physical section PA registered as the free area does not contribute much to the reduction of the write amount. Thus, in this third embodiment, without searching for the section having the maximum total write amount in the free area after the intra-section averaging processing, the physical section PA in which the target section of the intra-section averaging processing has been stored is reused to achieve simplification of the processing.

Note that, since the overall configuration as the information processing system and the block configuration of the memory controller are similar to those of the first embodiment described above, the detailed description thereof is omitted. Furthermore, since the write amount information is similar to that in the second embodiment described above, the detailed description thereof is omitted.

[Operation]

Figure 17:
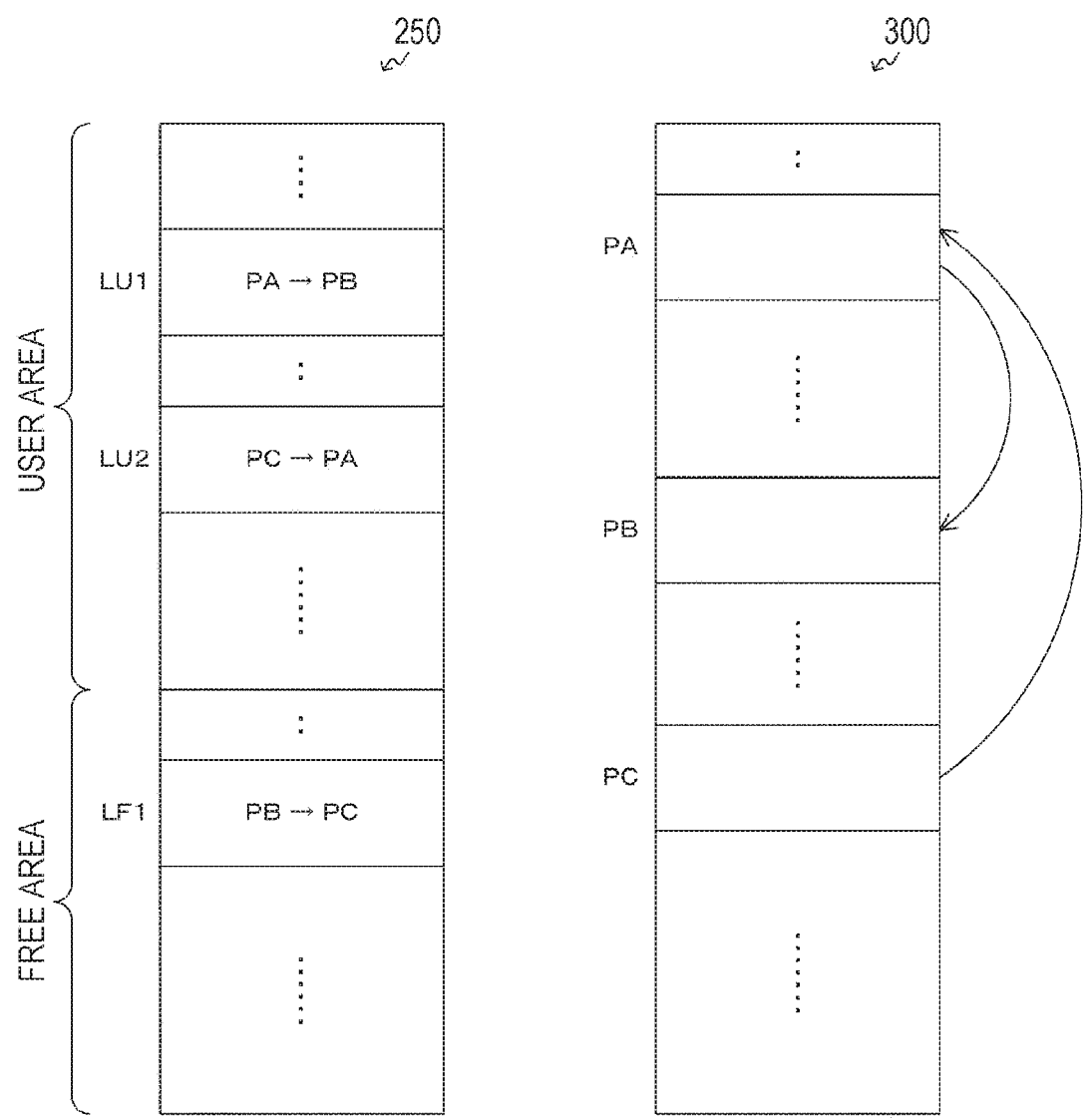
FIG. 17 is a diagram illustrating a schematic example of averaging processing in a third embodiment of the present technology.

FIG. 17 is a diagram illustrating a schematic example of the averaging processing in the third embodiment of the present technology. Here, similarly to the first embodiment described above, as the intra-section averaging processing, the section A having deviation in the write amount between pages is selected as a logical section, and the data in the section A is copied to the physical section PB by the inter-section copy processing unit 240.

Furthermore, similarly to the second embodiment described above, after the intra-section averaging processing, the logical section having the minimum total write amount and the copied flag being "0" in the user area is selected as the section C. At that time, it is assumed that the physical section PC is allocated as the physical address of the section C. That is, it is assumed that the physical section PC has been stored corresponding to the logical section LU2 of the user area, in the address conversion table 250.

In the second embodiment described above, the data of the section C stored in the physical section PC is copied to the physical section PD in the free area; however, in this third embodiment, the data of the section C is copied to the physical section PA. That is, the physical section PA is not registered in the free area, and is reused as the section C. Therefore, change is performed so that the physical section PA is stored corresponding to the logical section LU2 in the address conversion table 250.

On the other hand, the physical section PC having stored the data of the section C is registered in the free area. Therefore, change is performed so that the physical section PC is stored corresponding to the logical section LF1 in the address conversion table 250. Therefore, the physical section PC having a small write amount becomes the free area, and the write amount in the free area is reduced.

Figure 18:
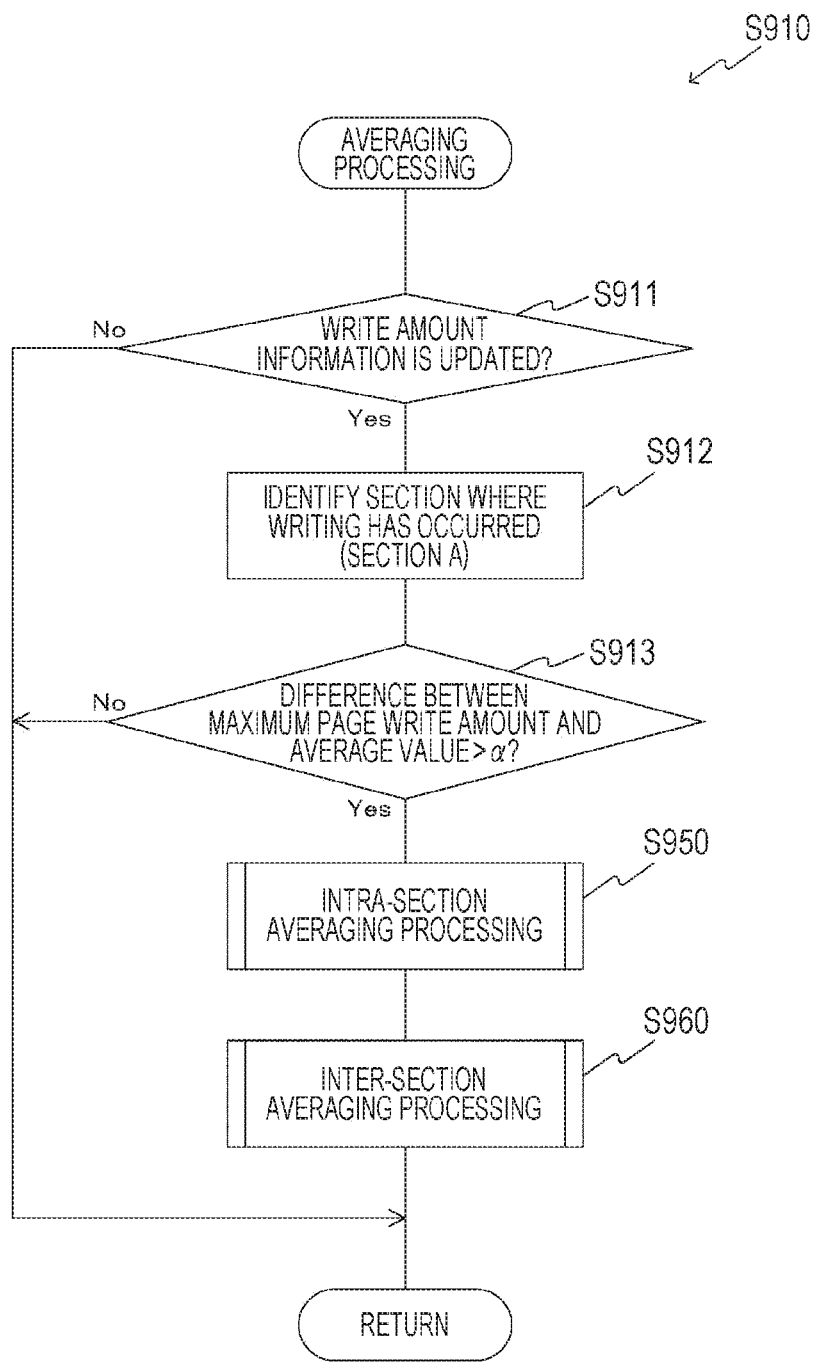
FIG. 18 is a flowchart illustrating an example of a processing procedure of the averaging processing in the third embodiment of the present technology.

FIG. 18 is a flowchart illustrating an example of a processing procedure of the averaging processing in the third embodiment of the present technology. Note that, since the overall processing of the memory access processing is similar to that of the first embodiment described above, the description thereof is omitted.

When the write amount information is updated in the write amount information table 220 (step S911: Yes), the averaging processing unit 230 identifies the section A where the writing has occurred (step S912). This point is similar to that in the first embodiment described above.

The averaging processing unit 230 determines whether or not the difference between the maximum page write amount and the average value of the page write amount is greater than the threshold value α in the section A where the writing has occurred (step S913). Then, in a case where the difference is greater than the threshold value α (step S913: Yes), the averaging processing unit 230 performs the intra-section averaging processing (step S950) and the inter-section averaging processing (step S960).

Figure 19:
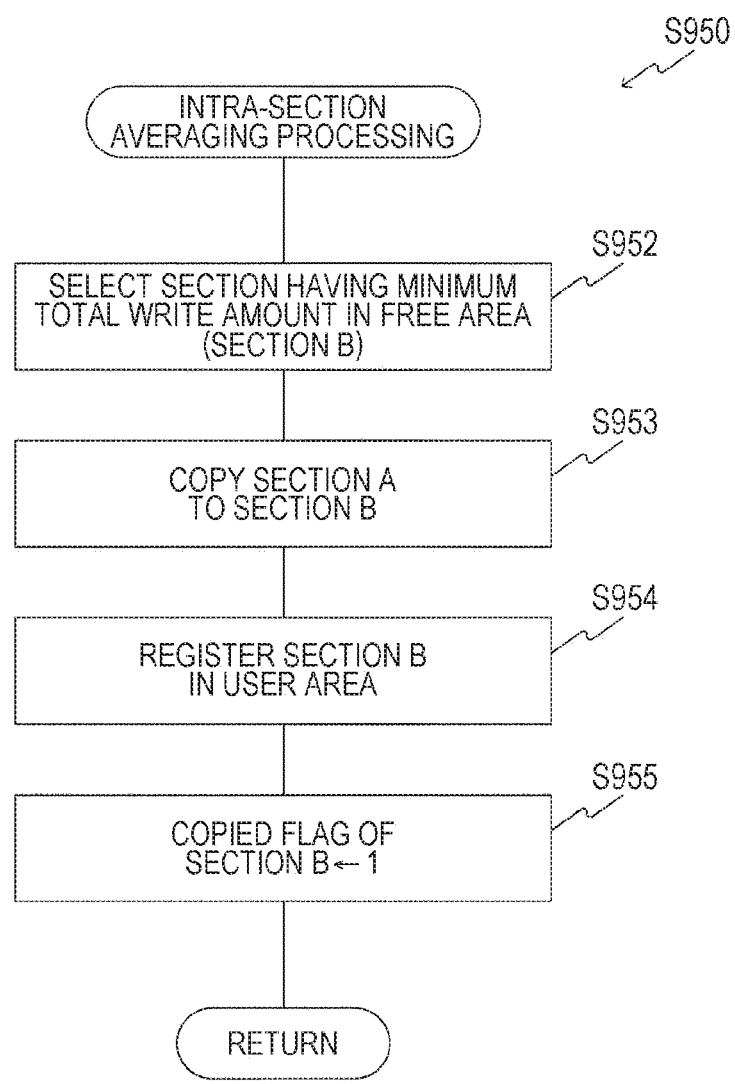
FIG. 19 is a flowchart illustrating an example of a processing procedure of intra-section averaging processing (step S950) in the third embodiment of the present technology.

FIG. 19 is a flowchart illustrating an example of a processing procedure of the intra-section averaging processing (step S950) in the third embodiment of the present technology.

The averaging processing unit 230 refers to the write amount information table 220, and selects the section B having the minimum total write amount in the free area (step S952). Note that, in this example, the section having the minimum total write amount is selected in the free area; however, a section may be selected having a total write amount less than the average value of the total write amount in the whole by at least a predetermined threshold value, in the free area.

Then, the inter-section copy processing unit 240 copies the data stored in the section A to the physical section PB of the section B (step S953).

The address conversion unit 260 registers the physical section PB allocated to the section B in the user area (step S954). That is, in the example described above, the physical section PB is stored corresponding to the logical address LU1 of the user area in the address conversion table 250.

Furthermore, the write amount measurement unit 210 sets the copied flag of the section B in the write amount information table 220 to "1" (step S955).

Figure 20:
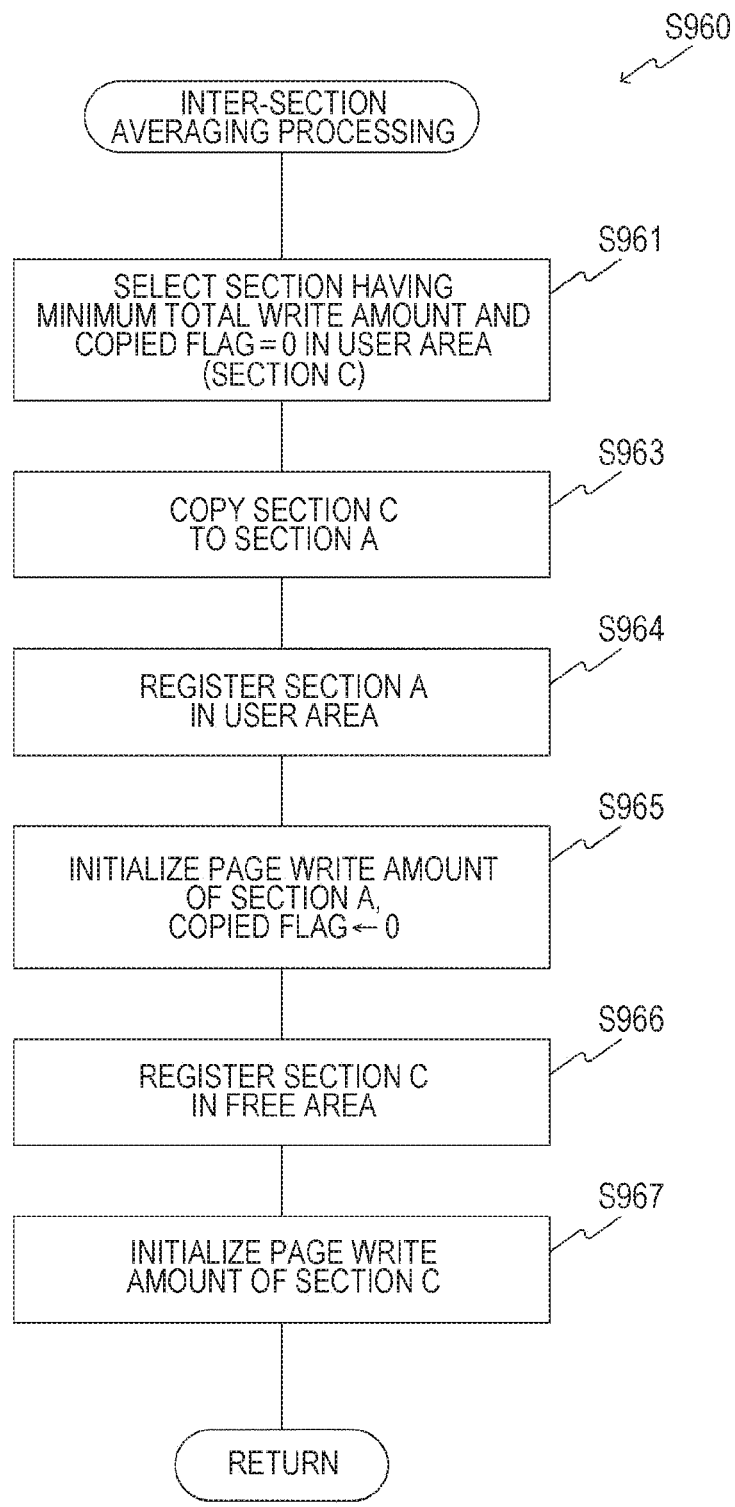
FIG. 20 is a flowchart illustrating an example of a processing procedure of inter-section averaging processing (step S960) in the third embodiment of the present technology.

FIG. 20 is a flowchart illustrating an example of a processing procedure of the inter-section averaging processing (step S960) in the third embodiment of the present technology.

The averaging processing unit 230 refers to the write amount information table 220, and selects a section having the minimum total write amount in the user area and the copied flag being "0" (step S961). Hereinafter, the selected logical section is referred to as the section C. Note that, in this example, the section having the minimum total write amount is selected in the user area; however, a section may be selected having a total write amount less than the average value of the total write amount in the whole by at least a predetermined threshold value, in the user area.

Then, the inter-section copy processing unit 240 copies the data stored in the section C to the physical section PA of the section A (step S963).

The address conversion unit 260 registers the physical section PA allocated to the section A in the user area where the section C is located (step S964). That is, in the example described above, the physical section PA is stored corresponding to the logical address LU2 of the user area in the address conversion table 250.

Furthermore, the write amount measurement unit 210 initializes the page write amount of the section A in the write amount information table 220, and resets the copied flag of the section A to "0" (step S965).

On the other hand, the address conversion unit 260 registers the physical section PC allocated to the section C in the free area (step S966). That is, in the example described above, the physical section PC is stored corresponding to the logical address LF1 of the free area in the address conversion table 250.

Furthermore, the write amount measurement unit 210 initializes the page write amount of the section C in the write amount information table 220 to "0" (step S967).

As described above, in the third embodiment of the present technology, after the intra-section averaging processing, the physical section PA is reused in which the target section of the intra-section averaging processing has been stored, whereby the processing efficiency can be improved.

4. Fourth Embodiment

In the second and third embodiments described above, after the intra-section averaging processing, replacement is performed between the section of the user area and the section of the free area. However, in a case where the total write amount of the section selected as having deviation in the write amount between pages is not so large, the replacement with the free area is not necessarily required. Thus, in this fourth embodiment, in a case where the total write amount of the section selected as having deviation in the write amount between pages is not larger than the average value of the total write amount of all sections, simplification of the processing is achieved without performing the inter-section averaging processing.

Note that, since the overall configuration as the information processing system and the block configuration of the memory controller are similar to those of the first embodiment described above, the detailed description thereof is omitted. Furthermore, since the write amount information is similar to that in the second embodiment described above, the detailed description thereof is omitted.

[Operation]

Figure 21:
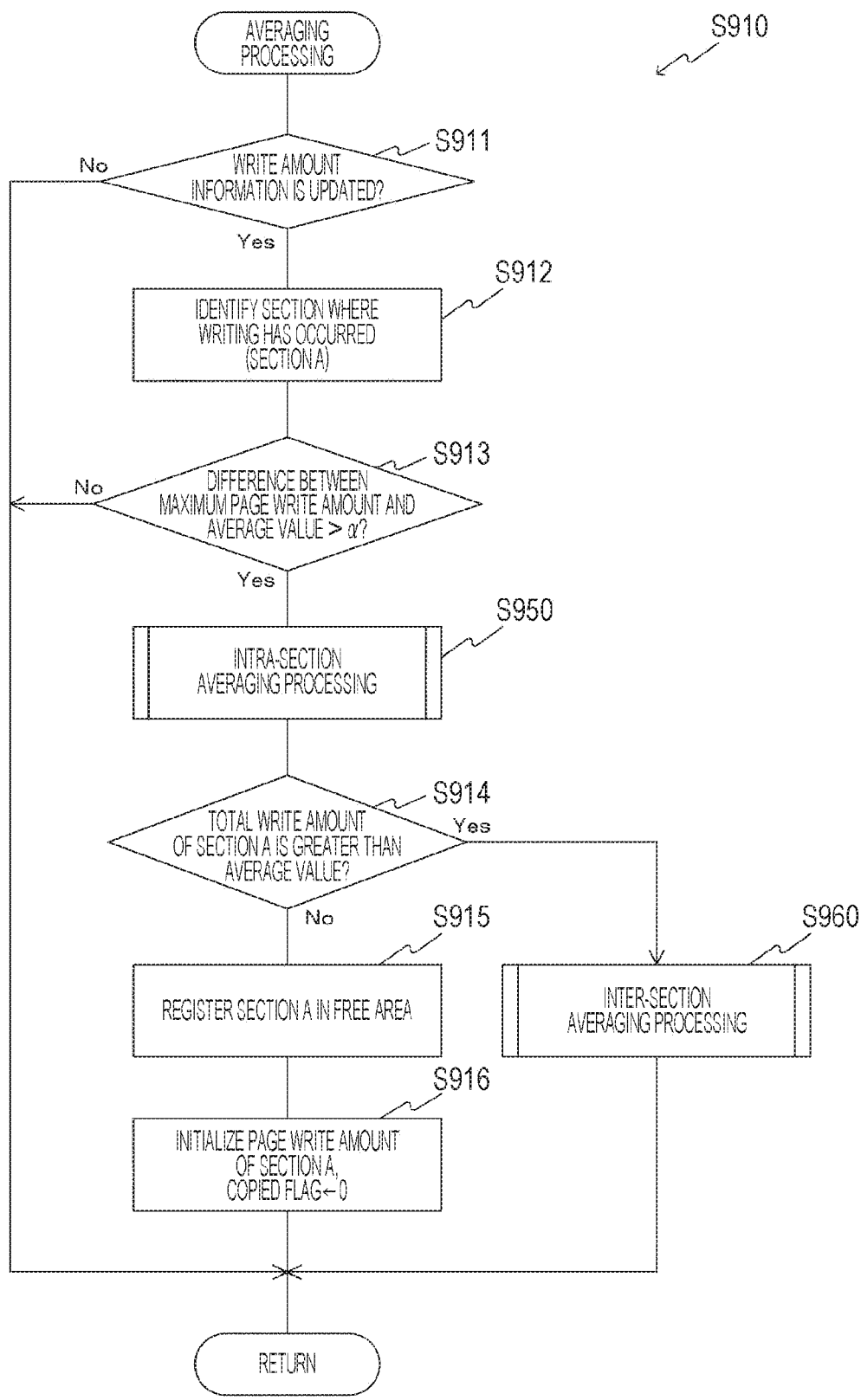
FIG. 21 is a flowchart illustrating an example of a processing procedure of averaging processing in a fourth embodiment of the present technology.

FIG. 21 is a flowchart illustrating an example of a processing procedure of the averaging processing in the fourth embodiment of the present technology. Note that, since the overall processing of the memory access processing is similar to that of the first embodiment described above, the description thereof is omitted.

When the write amount information is updated in the write amount information table 220 (step S911: Yes), the averaging processing unit 230 identifies the section A where the writing has occurred (step S912). This point is similar to that in the first embodiment described above.

The averaging processing unit 230 determines whether or not the difference between the maximum page write amount and the average value of the page write amount is greater than the threshold value $\alpha$ in the section A where the writing has occurred (step S913). Then, in a case where the difference is greater than the threshold value $\alpha$ (step S913: Yes), the averaging processing unit 230 performs the intra-section averaging processing (step S950).

Then, in a case where the total write amount of the section A where writing has occurred is greater than the average value of all sections of the total write amount (step S914: Yes), the averaging processing unit 230 performs the inter-section averaging processing (step S960). On the other hand, in a case where the total write amount of the section A is not greater than the average value of all sections (step S914: No), the address conversion unit 260 registers the physical section PA allocated to the section A in the free area (step S915). Furthermore, in this case, the write amount measurement unit 210 initializes the page write amount of the section A in the write amount information table 220 to "0", and resets the copied flag of the section A to "0" (step S916). Note that, in this example, a reference is whether or not the total write amount of the section A is greater than the average value of all sections of the total write amount; however, the reference may be whether or not the total write amount of the section A is greater than the average value of all sections of the total write amount by at least a predetermined threshold value.

Note that, since contents of the processing procedures in the intra-section averaging processing (step S950) and the inter-section averaging processing (step S960) are similar to those in the third embodiment described above, the description thereof is omitted.

As described above, according to the fourth embodiment of the present technology, in a case where the total write amount of the section where writing has occurred is not larger than the average value of all sections, the inter-section averaging processing is omitted, whereby the processing efficiency can be improved.

5. Fifth Embodiment

In the first to fourth embodiments described above, replacement is performed between sections, whereby averaging is achieved of the page write amount in the section. Thus, the order of the pages in the section has not been changed before and after the replacement. On the other hand, in the fifth embodiment, the order is changed of the pages in the section, whereby the effect of the averaging processing is further improved.

[Configuration of Memory Controller]

Figure 22:
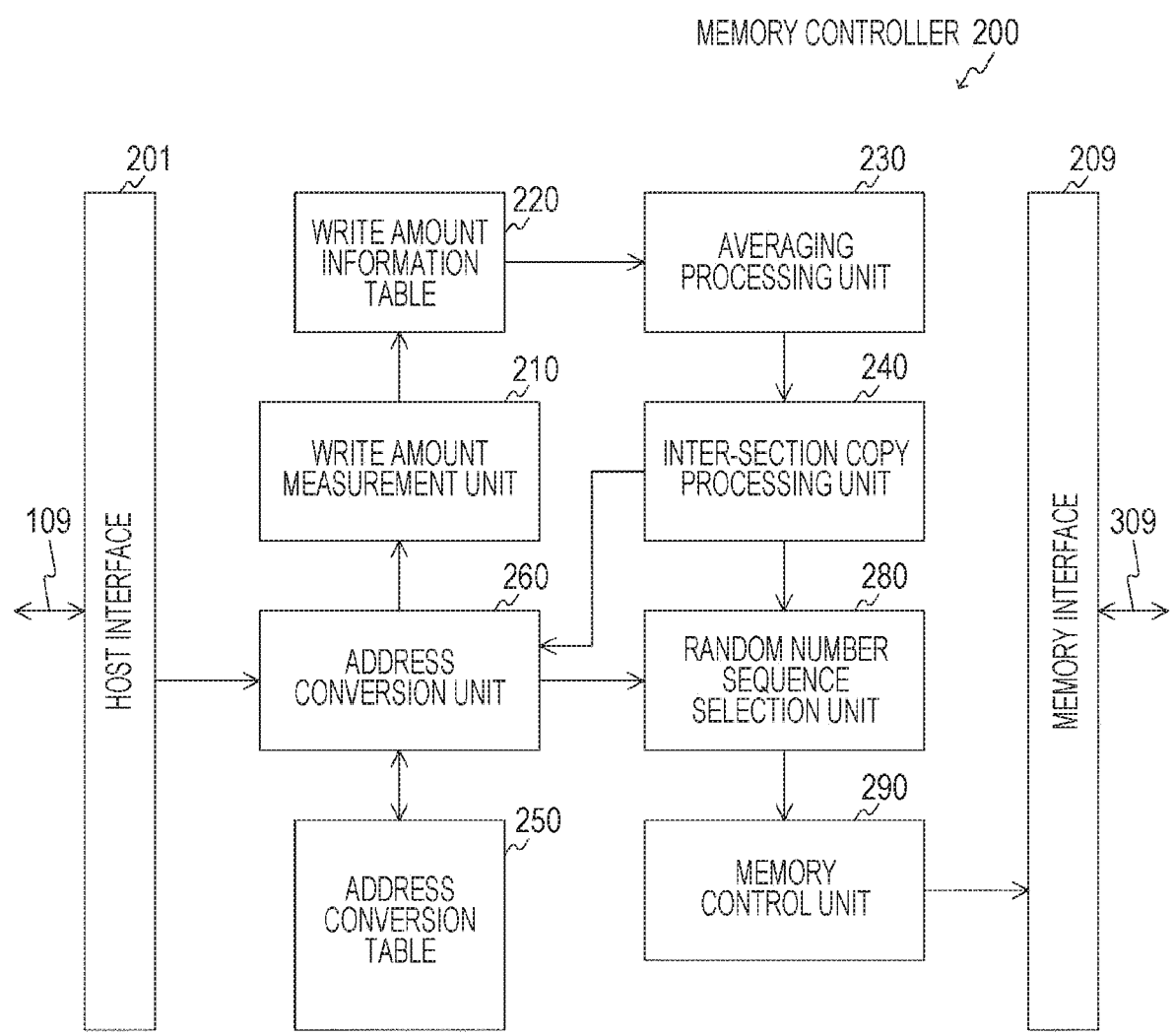
FIG. 22 is a diagram illustrating a configuration example of the memory controller 200 in a fifth embodiment of the present technology.

FIG. 22 is a diagram illustrating a configuration example of the memory controller 200 in the fifth embodiment of the present technology. Note that, since the overall configuration as the information processing system is similar to that of the first embodiment described above, the detailed description thereof is omitted.

The memory controller 200 in the fifth embodiment includes a random number sequence selection unit 280 in addition to the configuration of the first embodiment described above. When the inter-section copy processing unit 240 performs copying to the allocation change destination section, the random number sequence selection unit 280 selects a different order as a page arrangement order in the section. A random number sequence for defining the page arrangement order in the section is held in the address conversion table 250, for example. The random number sequence selection unit 280 changes the random number sequence to another one every time the copying is performed, thereby changing the page arrangement order in the section. Note that, the random number sequence selection unit 280 is an example of the selection unit described in the claims.

[Random Number Sequence]

Figure 23:
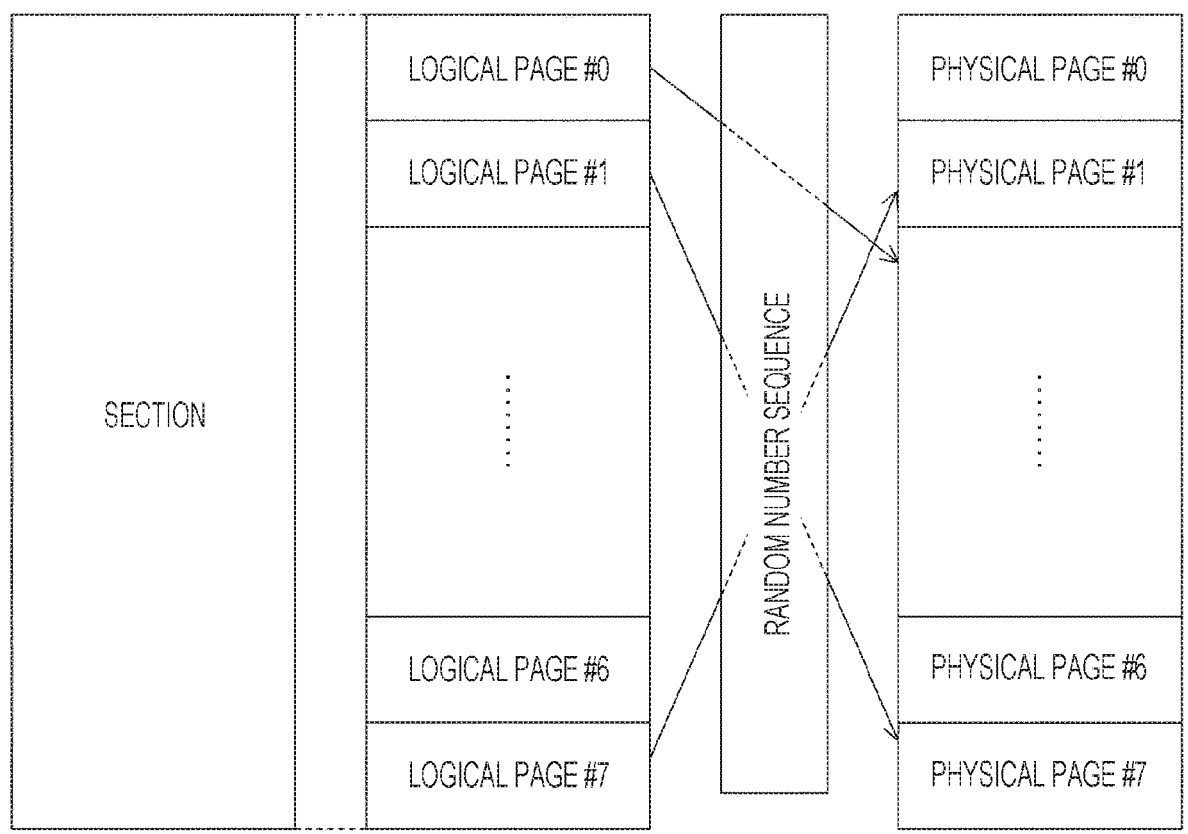
FIG. 23 is a diagram illustrating an example of a change mode of a page arrangement order in the fifth embodiment of the present technology.

FIG. 23 is a diagram illustrating an example of a change mode of the page arrangement order in the fifth embodiment of the present technology. As described above, it is assumed that one section includes eight pages, as an example. When the eight pages in the logical section are arranged in the physical section in the memory 300, the order is determined in accordance with a random number sequence.

FIG. 24 is a diagram illustrating an example of random number sequences in the fifth embodiment of the present technology. Here, page offsets #0 to #7 corresponding to eight pages in the physical section are indicated in the horizontal direction, and eight random number sequences #0 to #7 are indicated in the vertical direction.

Each random number sequence represents a page arrangement in the logical section. For example, in a case where the random number sequence #2 is used in a certain section, the logical page #0 is allocated to the physical page #2, and the logical page #4 is allocated to the physical page #6.

Note that, in this example, a Hadamard matrix is used, and the random number sequences included therein are different from each other. Thus, the same physical pages are not allocated to the same logical pages by different random number sequences.

Figure 25:
FIG. 25 is a diagram illustrating a configuration example of an address conversion table 250 in the fifth embodiment of the present technology.

FIG. 25 is a diagram illustrating a configuration example of the address conversion table 250 in the fifth embodiment of the present technology. The address conversion table 250 in the fifth embodiment holds physical section addresses #0 to #32767 and random number sequence selection information #0 to #32767 corresponding to the logical sections #0 to #32767.

The physical section address is similar to that in the embodiments described above, and indicates the physical section on the memory 300 corresponding to the logical section.

The random number sequence selection information indicates the random number sequence in the fifth embodiment corresponding to each logical section. It is not necessary to hold the random number sequence itself, and it is sufficient to hold the number of the random number sequence indicating the arrangement order of the logical pages in the physical section. For example, if "3" is held as the random number sequence selection information, it is understood that the logical page #6 is allocated to the physical page #5 in the physical section in the example described above. Note that, the random number sequence selection information is an example of the information described in the claims.

As described above, in the fifth embodiment of the present technology, the page arrangement order in the section is defined by the random number sequence, and the random number sequence is changed when copying is performed to the allocation change destination section. Therefore, the different order is used as the page arrangement order in the section, whereby the effect of the averaging processing can be further improved.

Note that, the embodiments described above each describe an example for embodying the present technology, and matters in the embodiments and matters specifying the invention in the claims have correspondence relationships. Similarly, the matters specifying the invention in the claims and the matters in the embodiments of the present technology denoted by the same names have correspondence relationships. However, the present technology is not limited to the embodiments, and can be embodied by subjecting the embodiments to various modifications without departing from the gist thereof.

Furthermore, the processing procedures described in the above embodiments may be regarded as a method having these series of procedures, and may be regarded as a program for causing a computer to execute these series of procedures or as a recording medium for storing the program. As the recording medium, for example, a Compact Disc (CD), MiniDisc (MD), Digital Versatile Disc (DVD), memory card, Blu-ray (registered trademark) Disc, or the like can be used.

Note that, the advantageous effects described in the specification are merely examples, and the advantageous effects of the present technology are not limited to them and may include other effects.

Note that, the present technology can also be configured as described below.

(1) A memory controller including:

an address conversion unit that performs address conversion between a logical address and a physical address for each of management units, the management units each including a plurality of access units of a memory;

a write amount measurement unit that measures a write amount for each of the access units in each of the management units; and an averaging processing unit that selects a target management unit from the management units on the basis of the measured write amount and changes physical address allocation in the address conversion of the target management unit, to average write amounts of the access units in the target management unit.

(2) The memory controller according to (1), in which the averaging processing unit selects one of the management units as the target management unit in a case where deviation occurs in write amounts of the access units in the one of the management units.

(3) The memory controller according to (1) or (2), in which the averaging processing unit selects one of the management units as the target management unit in a case where a maximum value of write amounts of the access units in the one of the management units is greater than an average value of write amounts of the access units in the one of the management units by a value exceeding a predetermined threshold value.

(4) The memory controller according to any of (1) to (3), in which a logical address space of the memory is managed by being divided into an in-use area and an unused area, and the averaging processing unit selects a new allocation destination of the target management unit from the unused area on the basis of the measured write amount and secures the new allocation destination as the in-use area.

(5) The memory controller according to (4), in which the averaging processing unit selects, as the new allocation destination of the target management unit, one of the management units in which a total of write amounts of the access units is less than an overall average value by at least a predetermined threshold value in the unused area.

(6) The memory controller according to (5), in which when the physical address allocation of the target management unit is changed, the averaging processing unit selects, as a second target management unit, one of the management units in which a total of write amounts of the access units is less than an overall average value by at least a predetermined threshold value in the in-use area other than the new allocation destination, and selects, as a new allocation destination of the second target management unit, one of the management units in which a total of write amounts of the access units is maximized in the unused area, to change physical address allocation in the address conversion of the second target management unit.

(7) The memory controller according to (6), further including a flag that holds, for each of the management targets, that each of the management targets has become a physical address allocation change target, in which the averaging processing unit sets the flag corresponding to the new allocation destination to indicate that the management target has become a physical address allocation change target, and excludes one of the management units in which the flag is set from a selection target when selecting the second target management unit in the in-use area.

(8) The memory controller according to (4), in which the averaging processing unit allocates a physical address before allocation change of the target management unit to the unused area.

(9) The memory controller according to (4), in which the averaging processing unit allocates a physical address before allocation change of the target management unit to the in-use area for use for other management targets.

(10) The memory controller according to (4), in which the averaging processing unit, in a case where a total of write amounts of the access units of the target management unit is greater than an overall average value of the management targets by at least a predetermined threshold value, allocates a physical address before allocation change of the target management unit to the in-use area for use for other management targets, and otherwise, allocates the physical address before allocation change of the target management unit to the unused area.

(11) The memory controller according to any of (1) to (4), further including a selection unit that holds information defining an arrangement order of the access units in the management units for each of the management units, and selects different orders as arrangement orders of the access units in the target management unit before and after physical address allocation change of the target management unit.

(12) The memory controller according to (11), in which the information defining the arrangement order of the access units is a plurality of random number sequences different from each other.

(13) A memory system including:

a memory;

an address conversion unit that performs address conversion between a logical address and a physical address for each of management units, the management units each including a plurality of access units of the memory;

a write amount measurement unit that measures a write amount for each of the access units in each of the management units; and an averaging processing unit that selects a target management unit from the management units on the basis of the measured write amount and changes physical address allocation in the address conversion of the target management unit, to average write amounts of the access units in the target management unit.

(14) An information processing system including:

a memory;

a host computer that issues a host command for accessing the memory;

an address conversion unit that performs address conversion between a logical address of the host command and a physical address of the memory for each of management units, the management units each including a plurality of access units of the memory;

a write amount measurement unit that measures a write amount for each of the access units in each of the management units; and an averaging processing unit that selects a target management unit from the management units on the basis of the measured write amount and changes physical address allocation in the address conversion of the target management unit, to average write amounts of the access units in the target management unit.

(15) A memory control method including:

an address conversion procedure of performing address conversion between a logical address and a physical address for each of management units, the management units each including a plurality of access units of a memory;

a write amount measurement procedure of measuring a write amount for each of the access units in each of the management units; and an averaging processing procedure of selecting a target management unit from the management units on the basis of the measured write amount and changing physical address allocation in the address conversion of the target management unit, to average write amounts of the access units in the target management unit.

REFERENCE SIGNS LIST

100 Host computer
200 Memory controller
201 Host interface
209 Memory interface
210 Write amount measurement unit
220 Write amount information table
230 Averaging processing unit
240 Inter-section copy processing unit
250 Address conversion table
260 Address conversion unit
280 Random number sequence selection unit
290 Memory control unit
300 Memory
400 Memory system

The invention claimed is:

1. A memory controller, comprising:
an address conversion unit configured to execute address conversion between a logical address and a physical address for each management unit of a plurality of management units, wherein each management unit of the plurality of management units includes a plurality of access units of a memory;
a write amount measurement unit configured to measure a write amount for each access unit of the plurality of access units in each management unit of the plurality of management units; and
an averaging processing unit configured to:
 select a first management unit of the plurality of management units as a first target management unit based on a difference between a maximum value of first write amounts of the plurality of access units in the first management unit and an average value of the first write amounts of the plurality of access units in the first management unit, wherein the difference exceeds a first threshold value; and
 change physical address allocation in the address conversion of the first target management unit to average the first write amounts of the plurality of access units in the first target management unit.

2. The memory controller according to claim 1, wherein the memory includes a logical address space divided into an in-use area and an unused area, and
the averaging processing unit is further configured to:
 select a new allocation destination of the first target management unit from the unused area based on the measured write amount; and
 secure the new allocation destination of the first target management unit as the in-use area.

3. The memory controller according to claim 2, wherein the averaging processing unit is further configured to select, as the new allocation destination of the first target management unit, a second management unit of the plurality of management units in the unused area, and
a total of second write amounts of the plurality of access units in the second management unit is less than an average value of third write amounts of the plurality of management units in the unused area.

4. The memory controller according to claim 3, wherein in a case where the physical address allocation of the first target management unit is changed, the averaging processing unit is further configured to:
 select, as a second target management unit, a third management unit of the plurality of management units in the in-use area, wherein
  the third management unit is different from the new allocation destination of the first target management unit, and
  a total of fourth write amounts of the plurality of access units in the third management unit is less than an average value of fifth write amounts of the plurality of management units in the in-use area; and
 select, as a new allocation destination of the second target management unit, a fourth management unit of the plurality of management units in the unused area, wherein a total of sixth write amounts of the plurality of access units in the fourth management unit is a maximum among the plurality of management units in the unused area; and
 change physical address allocation in the address conversion of the second target management unit.

5. The memory controller according to claim 4, further comprising a flag for each management unit of the plurality of management units,
wherein the averaging processing unit is further configured to:
 set the flag corresponding to the second management unit to indicate that the first target management unit has become a physical address allocation change target; and
 exclude, based on the flag, the second management unit from a selection target in the selection of the second target management unit in the in-use area.

6. The memory controller according to claim 2, wherein the averaging processing unit is further configured to allocate the physical address before allocation change of the first target management unit to the unused area.

7. The memory controller according to claim 2, wherein the averaging processing unit is further configured to allocate the physical address before allocation change of the first target management unit to the in-use area.

8. The memory controller according to claim 2, wherein in a case where a total of the first write amounts of the plurality of access units of the first target management unit is greater than an average value of second write amounts of the plurality of management units by at least a second threshold value, the averaging processing unit is further configured to allocate the physical address before allocation change of the first target management unit to the in-use area, and
in a case where the total of the first write amounts of the plurality of access units of the first target management unit is less than the average value of the second write amounts of the plurality of management units, the averaging processing unit is further configured to allocate the physical address before the allocation change of the first target management unit to the unused area.

9. The memory controller according to claim 1, further comprising a selection unit configured to:
 hold information that indicates an arrangement order of the plurality of access units in each management unit of the plurality of management units; and
 select different orders as arrangement orders of the plurality of access units in the first target management unit before and after the change of the physical address allocation of the first target management unit.

10. The memory controller according to claim 9, wherein the information further indicates that the arrangement order of the plurality of access units is a plurality of random number sequences, and
a first random number sequence of the plurality of random number sequences is different from a second random number sequence of the plurality of random number sequences.

11. A memory system, comprising:
a memory;
an address conversion unit configured to execute address conversion between a logical address and a physical address for each management unit of a plurality of management units, wherein each management unit of the plurality of management units includes a plurality of access units of the memory;
a write amount measurement unit configured to measure a write amount for each access unit of the plurality of access units in each management unit of the plurality of management units; and an averaging processing unit configured to:
  select a management unit of the plurality of management units as a target management unit based on a difference between a maximum value of write amounts of the plurality of access units in the management unit and an average value of the write amounts of the plurality of access units in the management unit, wherein the difference exceeds a threshold value; and
  change physical address allocation in the address conversion of the target management unit to average the write amounts of the plurality of access units in the target management unit.

12. An information processing system, comprising:
a memory;
a host computer configured to issue a host command to access the memory;
an address conversion unit configured to execute address conversion between a logical address of the host command and a physical address of the memory for each management unit of a plurality of management units, wherein each management unit of the plurality of management units includes a plurality of access units of the memory;
a write amount measurement unit configured to measure a write amount for each access unit of the plurality of access units in each management unit of the plurality of management units; and
an averaging processing unit configured to:
  select a management unit of the plurality of management units as a target management unit based on a difference between a maximum value of write amounts of the plurality of access units in the management unit and an average value of the write amounts of the plurality of access units in the management unit, wherein the difference exceeds a threshold value; and
  change physical address allocation in the address conversion of the target management unit to average the write amounts of the plurality of access units in the target management unit.

13. A memory control method, comprising:
executing address conversion between a logical address and a physical address for each management unit of a plurality of management units, wherein each management unit of the plurality of management units includes a plurality of access units of a memory;
measuring a write amount for each access unit of the plurality of access units in each management unit of the plurality of management units; and
selecting a management unit of the plurality of management units as a target management unit based on a difference between a maximum value of write amounts of the plurality of access units in the management unit and an average value of the write amounts of the plurality of access units in the management unit, wherein the difference exceeds a threshold value;
and
changing physical address allocation in the address conversion of the target management unit to average the write amounts of the plurality of access units in the target management unit.

* * * * *